United States Patent
Liebman

(10) Patent No.: US 9,552,843 B2
(45) Date of Patent: Jan. 24, 2017

(54) MEDIA FILE ACCESS AND STORAGE SOLUTION FOR MULTI-WORKSTATION/MULTI-PLATFORM NON-LINEAR VIDEO EDITING SYSTEMS

(76) Inventor: Andrew Liebman, Brookline, MA (US)

(*) Notice: Subject to any disclaimer, the term of this patent is extended or adjusted under 35 U.S.C. 154(b) by 0 days.

(21) Appl. No.: 12/999,964

(22) PCT Filed: Jun. 19, 2009

(86) PCT No.: PCT/US2009/048056
§ 371 (c)(1),
(2), (4) Date: Mar. 10, 2011

(87) PCT Pub. No.: WO2009/155578
PCT Pub. Date: Dec. 23, 2009

(65) Prior Publication Data
US 2011/0167036 A1  Jul. 7, 2011

Related U.S. Application Data

(60) Provisional application No. 61/074,125, filed on Jun. 19, 2008.

(51) Int. Cl.
  *G06F 7/00* (2006.01)
  *G11B 27/034* (2006.01)
  (Continued)

(52) U.S. Cl.
  CPC ........... *G11B 27/034* (2013.01); *G11B 27/329* (2013.01); *G11B 27/34* (2013.01)

(58) Field of Classification Search
  CPC ...... G11B 27/34; G11B 27/034; G11B 27/329
  (Continued)

(56) References Cited

U.S. PATENT DOCUMENTS 5,649,200 A   7/1997   Leblang et al.
5,706,510 A   1/1998   Burgoon
(Continued)

FOREIGN PATENT DOCUMENTS

JP   2004-078535   11/2004
WO   WO 99/26170   5/1999
(Continued)

OTHER PUBLICATIONS

TVTechnology, "ESPN Star Sports Selects Omneon MediaGrid and Spectrum for New Tapeless Production Environment", Oct. 2, 2006, 2 pages printed on Dec. 19, 2013.*
(Continued)

*Primary Examiner* — Tony Mahmoudi
*Assistant Examiner* — Michael Le
(74) *Attorney, Agent, or Firm* — Sean D. Detweiler, Esq.; Morse, Barnes-Brown & Pendleton, P.C.

(57) ABSTRACT

A novel system, method and computer program product for accessing digital media files stored in a media storage device via a server device in communication with the media storage device. The method provides a Project Sharing feature for enabling collaborative sharing of Non Linear Editing (NLE) Projects, even though the NLE application might normally define and save Projects as a single monolithic project file. The system and method provides a file directory and symlink scheme that allows ALL editors who are "members" of a Project Space to see all the bins created by all other editors, but controlling the WRITE ACCESS to the bins according to whose "User Folder" the bins resided in, i.e., a user-based locking scheme is provided to allow control over who can and cannot write to a file. The system and method further treats a single monolithic project file as a collection of smaller Project files, the permissions and ownerships of which could each be controlled independently.

18 Claims, 16 Drawing Sheets

(51) Int. Cl.
*G11B 27/32* (2006.01)
*G11B 27/34* (2006.01)

(58) Field of Classification Search
USPC .......................................................... 707/608
See application file for complete search history.

(56) References Cited

U.S. PATENT DOCUMENTS

| | | | |
|---|---|---|---|
| 5,883,670 A | 3/1999 | Sporer et al. | |
| 5,920,873 A | 7/1999 | Van Huben | |
| 6,044,374 A | 3/2000 | Nesamoney et al. | |
| 6,091,778 A | 7/2000 | Sporer et al. | |
| 6,167,083 A | 12/2000 | Sporer et al. | |
| 6,195,650 B1 | 2/2001 | Gaither et al. | |
| 6,230,185 B1* | 5/2001 | Salas | G06F 17/3089 707/E17.116 |
| 6,301,105 B2 | 10/2001 | Glorioso et al. | |
| 6,321,219 B1 | 11/2001 | Grainer et al. | |
| 6,337,880 B1 | 1/2002 | Cornog et al. | |
| 6,389,433 B1 | 5/2002 | Bolosky et al. | |
| 6,457,021 B1 | 9/2002 | Berkowitz et al. | |
| 6,469,711 B2 | 10/2002 | Foreman et al. | |
| 6,519,571 B1* | 2/2003 | Guheen et al. | 705/14.66 |
| 6,584,152 B2 | 6/2003 | Sporer | |
| 6,628,303 B1 | 9/2003 | Foreman et al. | |
| 6,768,996 B1 | 7/2004 | Steffens et al. | |
| 6,996,588 B2 | 2/2006 | Azagury et al. | |
| 7,028,262 B2 | 4/2006 | Estrada et al. | |
| 7,062,532 B1* | 6/2006 | Sweat | G06Q 10/06 709/205 |
| 7,069,594 B1 | 6/2006 | Bolin | |
| 7,124,366 B2 | 10/2006 | Foreman et al. | |
| 7,293,033 B1 | 11/2007 | Tormasov et al. | |
| 7,610,219 B2 | 10/2009 | Sayed | |
| 7,761,574 B2 | 7/2010 | Liebman | |
| 7,783,665 B1 | 8/2010 | Tormasov et al. | |
| 8,266,283 B2 | 9/2012 | Liebman | |
| 2001/0006453 A1 | 7/2001 | Glorioso et al. | |
| 2001/0014892 A1 | 8/2001 | Gaither et al. | |
| 2001/0024472 A1 | 9/2001 | Sporer et al. | |
| 2001/0040592 A1 | 11/2001 | Foreman et al. | |
| 2001/0051955 A1 | 12/2001 | Wong | |
| 2002/0072956 A1 | 6/2002 | Willems et al. | |
| 2002/0073114 A1* | 6/2002 | Nicastro | G06Q 10/06 705/36 R |
| 2002/0073144 A1* | 6/2002 | Katoh et al. | 709/203 |
| 2002/0129274 A1 | 9/2002 | Baskey et al. | |
| 2002/0138843 A1 | 9/2002 | Samaan et al. | |
| 2002/0149618 A1 | 10/2002 | Estrada et al. | |
| 2002/0165856 A1* | 11/2002 | Gilfillan et al. | 707/3 |
| 2003/0046639 A1 | 3/2003 | Fai | |
| 2003/0095789 A1* | 5/2003 | Wakimoto et al. | 386/52 |
| 2003/0097276 A1 | 5/2003 | Kirkland | |
| 2003/0227487 A1* | 12/2003 | Hugh | G06F 17/30958 715/777 |
| 2004/0002990 A1 | 1/2004 | Sander et al. | |
| 2004/0049520 A1 | 3/2004 | Bowers et al. | |
| 2004/0056882 A1 | 3/2004 | Foreman et al. | |
| 2004/0066395 A1 | 4/2004 | Foreman et al. | |
| 2004/0071441 A1 | 4/2004 | Foreman et al. | |
| 2004/0088313 A1* | 5/2004 | Torres | G06F 17/30011 |
| 2004/0199578 A1 | 10/2004 | Kapczynski et al. | |
| 2005/0086296 A1* | 4/2005 | Chi et al. | 709/203 |
| 2005/0091289 A1* | 4/2005 | Shappell | G06F 17/30067 |
| 2005/0108685 A1 | 5/2005 | Ta | |
| 2006/0026213 A1 | 2/2006 | Yaskin | G09B 7/02 |
| 2006/0053442 A1 | 3/2006 | Ridderheim et al. | |
| 2006/0092178 A1* | 5/2006 | Tanguay, Jr. | G06K 9/00355 345/629 |
| 2006/0098941 A1* | 5/2006 | Abe et al. | 386/52 |
| 2006/0184673 A1 | 8/2006 | Liebman | |
| 2006/0253542 A1 | 11/2006 | McCausland et al. | |
| 2007/0011304 A1* | 1/2007 | Error | G06Q 30/02 709/224 |
| 2007/0022215 A1 | 1/2007 | Singer et al. | |
| 2007/0078768 A1 | 4/2007 | Dawson | |
| 2007/0094601 A1* | 4/2007 | Greenberg et al. | 715/713 |
| 2008/0256242 A1 | 10/2008 | Liebman | |
| 2009/0037520 A1* | 2/2009 | Loffredo | 709/203 |
| 2009/0164902 A1 | 6/2009 | Cohen et al. | |
| 2011/0125818 A1 | 5/2011 | Liebman | |
| 2011/0196842 A1 | 8/2011 | Timashev | |

FOREIGN PATENT DOCUMENTS

| | | |
|---|---|---|
| WO | WO 99/46934 | 9/1999 |
| WO | WO 2005/089446 | 9/2005 |
| WO | WO 2007/082171 | 7/2007 |
| WO | WO 2009/129252 | 10/2009 |
| WO | WO 2009/155578 | 12/2009 |

OTHER PUBLICATIONS

Omneon, "NDR Builds Forward-Looking Workflow on Omneon Media Storage and Processing Platform", 2010, 4 pages printed Dec. 19, 2013.*
CreativePlanetNetwork, "Omneon Spectrum Server System Takes TPT Tapeless", unknown date, 2 pages printed Dec. 19, 2013.*
Björn Adamski, "MXF-Erweiterung für QuickTime," FKT Fernseh Und Kinotechnik, Fachverlag Schiele & Schon GMBH., Berlin, DE, 62(4): 2008.
Supplementary European Search Report for European Application No. 09731871.1, mailed Nov. 10, 2011.
Notice of Allowance for U.S. Appl. No. 11/403,036, dated Apr. 23, 2012.
Final Office Action for U.S. Appl. No. 12/937,859, dated May 2, 2013.
International Search Report for International Application PCT/US2009/040546, dated Nov. 25, 2009.
International Search Report for International Application PCT/US2009/048056, dated Feb. 1, 2010.
Supplementary European Search Report for European Application No. 09767886, mailed Nov. 4, 2011.
Supplementary European Search Report for European Application No. 09731871.1, mailed Oct. 14, 2011.
Non-Final Office Action for U.S. Appl. No. 12/937,859, dated Oct. 19, 2012.
Non-Final Office Action for U.S. Appl. No. 12/999,964, dated Mar. 29, 2012.
Non-Final Office Action for U.S. Appl. No. 11/403,036, dated May 14, 2009.
Non-Final Office Action for U.S. Appl. No. 11/403,036, dated Sep. 23, 2010.
Notice of Allowance for U.S. Appl. No. 12/102,563, dated Mar. 9, 2010.
Final Office Action for U.S. Appl. No. 11/403,036, dated Mar. 11, 2010.
Final Office Action for U.S. Appl. No. 11/403,036, dated Mar. 1, 2011.
Non-Final Office Action for U.S. Appl. No. 13/584,149, dated Sep. 12, 2013.
Notice of Allowance for U.S. Appl. No. 13/584,149, dated Jan. 30, 2014.
Non-Final Office Action for U.S. Appl. No. 12/937,859, dated Jul. 10, 2014.
International Search Report for International Application PCT/US2012/032535, dated Jul. 13, 2012.
Lowry, "Hacker's Guide to QuickTime," 2004, http://home.sol.se/michael/qtguide/.
Notice of Allowance for U.S. Appl. No. 12/937,859, dated Mar. 12, 2015.
Supplementary European Search Report for European Application No. 12767666.6, mailed Nov. 4, 2014.
Final Office Action for U.S. Appl. No. 12/937,859, dated Jan. 22, 2015.
Tortoises SVN Course, Baidu Library. B370606121, Nov. 16, 2010.

(56) References Cited

OTHER PUBLICATIONS

Non-Final Office Action for U.S. Appl. No. 14/008,368, dated Nov. 12, 2015.
Non-Final Office Action for U.S. Appl. No. 14/008,368, dated Aug. 16, 2016.
Final Office Action for U.S. Appl. No. 12/999,964, dated Apr. 7, 2016.

* cited by examiner

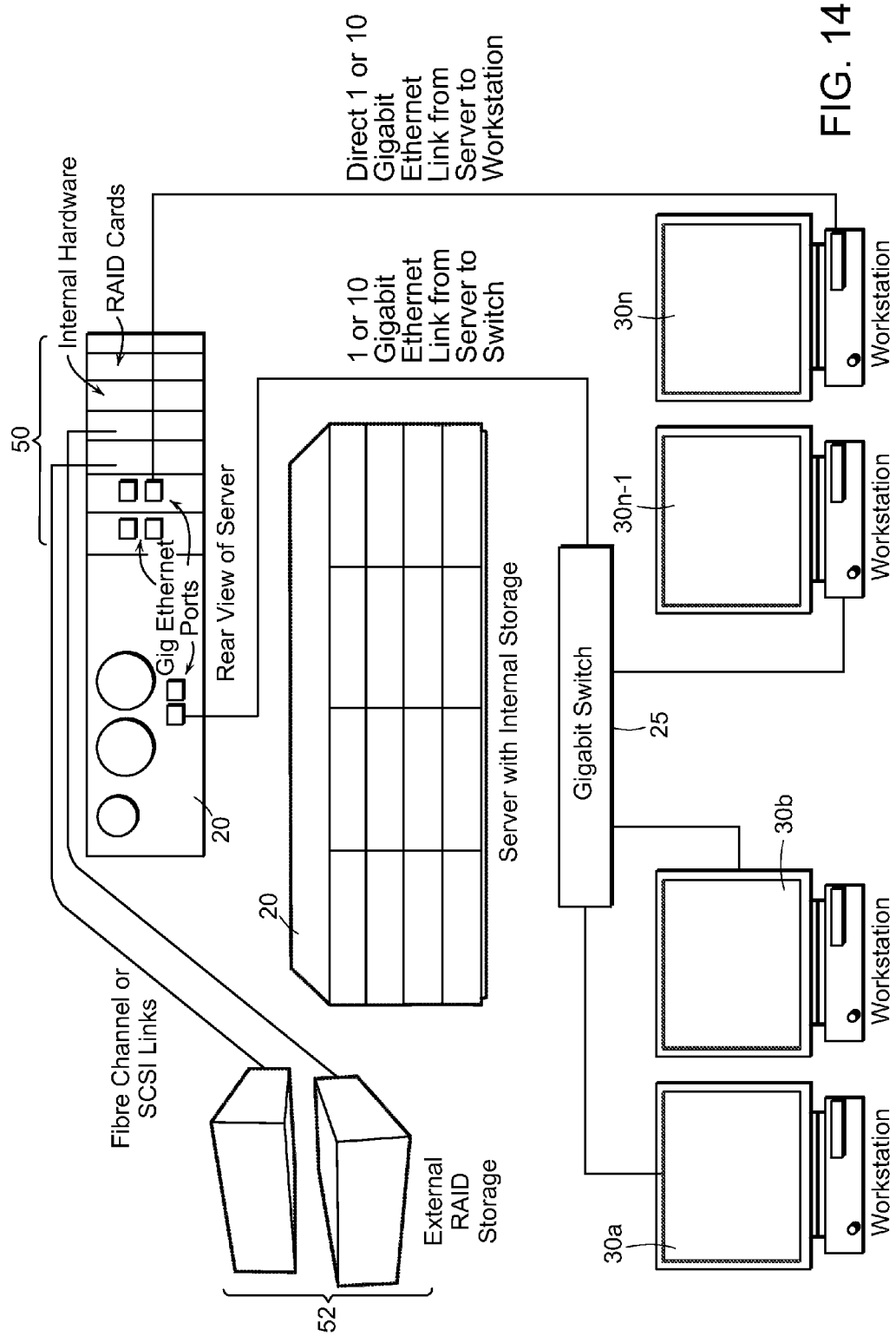

MEDIA FILE ACCESS AND STORAGE SOLUTION FOR MULTI-WORKSTATION/MULTI-PLATFORM NON-LINEAR VIDEO EDITING SYSTEMS

CROSS-REFERENCE TO RELATED APPLICATIONS

This application is a national stage filing under 35 U.S.C. 371 of International Application No. PCT/US2009/048056, filed Jun. 19, 2009, which claims the benefit of and priority to U.S. Provisional Application No. 61/074,125, filed on Jun. 19, 2008. The entire content of PCT Application No. PCT/US2009/048056 is incorporated by reference herein. International Application PCT/US2009/048056 was published under PCT Article 21(2) in English.

BACKGROUND

United States Patent Publication No. 20060184673 A1 describes a means and method by which non-linear video editing "Projects", e.g. such as those created by Avid Non-Linear Video Editing (NLE) applications can be converted into Shared Avid Projects, thereby enabling two or more video editors to collaborate safely and efficiently such that all editors can see what colleagues are editing without danger of one editor overwriting the work of another editor.

The use of the "symbolic link" virtualization scheme as described in United States Patent Publication No. 20060184673 A1 enables a collaborative storage system to set up a structure that allows non-linear video editors, such as AVID's Xpress Pro® HD Non Linear Editing (NLE) application, to share the same "Project" in addition to sharing the same media files. In the context of the AVID® Non-Linear Video Editing, a "Project" is comprised of metadata that includes bins and sequences and "clips" that all refer to media files, but the contents of Projects are not media files themselves. For editors who use Avid non-linear video editing applications, the Project data created by most Avid non-linear video editing applications is not stored in single monolithic files, as it is with many other popular non-linear editing applications like Apple's Final Cut Pro®. Avid® Projects by design are typically broken up into many discrete elements that at the operating system level are really just filesystem folders and files. Thus, in Avid® Projects, it is possible to manipulate these discrete elements individually. For example, it is possible to set write permissions differently on one folder or file versus others. And by the symbolic link technique described, it is possible to create different "virtual views" of an Avid® Project, such that each user has an optimized view of the Project and each user can maintain his/her own separate files for the same function (i.e., for settings).

That is, as one of the distinctive features of Avid® NLE applications is that they store metadata (for example, references to clips, subclips, and sequences) in "bin files" which are real files at the filesystem level. Avid® NLE applications support simultaneously opening multiple bin files and furthermore, simultaneously opening multiple elements referenced by each bin file (for example, clips, subclips, and sequences) and cutting, copying and pasting between bins. The overall Avid bin scheme made it feasible to divide up and organize a Project into multiple bins—for instance, having one bin for raw digitized material, one bin for each scene, one for finished rough cuts, one for fine cuts, etc. As such, a typical Avid® NLE project will consist of multiple bin files, each referencing some portion of the overall Project.

It would be highly desirable to provide as part of a centralized collaborative storage system a system and method to allow multiple non-linear editing systems to safely open up and work from and collaborate on the same "Project". In the world of non-linear editing, Projects are generally understood to encompass "metadata" that refers to media files and not the media files themselves. In their most basic form, Projects include "clips" that refer to entire media files, "subclips" that refer to parts of media files, and "sequences" that refer to media files (in part or in their entirety) all strung together to make a story or program". In the context of non-linear video editing, the creative work of an editor is generally stored in the Project. Unlike media files, which are typically never modified in the course of editing, Project files are changing all the time because they reflect the editing decisions of an editor. The normal practice of editors therefore is to each maintain their own Projects, because if two or more editors were to open up the same Project from two different non-linear editing workstations (assuming the Project was stored in some central location that could be accessed by more than one editor), one editor would be at great risk for overwriting the changes that others are making, and vice versa. The risk of overwriting changes applies to any information contained in the Project, including settings, bins, sequences, etc. Also, if multiple editors were to open up the same Project file, they would all be confronted with a clutter of information that made it hard to sort out what was being edited by which editor, and who should have modification authority over which metadata.

It would therefore further be highly desirable to provide a centralized collaborative storage system for non-linear editing systems that manages ownership and permissions over different editors' contributions to shared Projects and that implements "symbolic links" to create a virtual file and folder structure that allows multiple non-linear editing systems to collaborate on the same project, keeping work organized so that it is clear which editor is editing what and allowing each editor to maintain his/her own settings for the Project.

It would be further highly desirable to create a collaborative editing environment on a that enables one or more editors running a non-linear video editing (NLE) program to collaborate on Projects despite the fact that the program natively saves projects as a single monolithic and non-divisible file.

It would be further highly desirable to create a collaborative video editing environment on a centralized data storage system equipped with a tool for creating on centralized data storage system a Shared Project Space to which users could be added, defining who has access to that Project Space.

It would be further highly desirable to create a collaborative video editing environment on a centralized data storage system equipped with a tool for creating in a given Shared Project Space one or more upper-level folders, each of which can be defined as unique "Shared Project" and into which editors can put project files that represent some portion of an overall project.

It would be further highly desirable to create a collaborative editing environment on a centralized data storage equipped with a mechanism for controlling the permissions and ownership of the project files such that multiple users cannot overwrite each other's work.

SUMMARY

It is thus an object of the present invention to provide a collaborative editing environment on a centralized data storage system that enables one or more editors running a non-linear video editing (NLE) program to collaborate on Projects despite the fact that the NLE program natively saves projects as a single monolithic and non-divisible file. Fundamental to the invention is the realization that when working with some NLE programs that were designed to save Projects as single monolithic files, it is often not actually necessary to put all project metadata (clip references, subclip references, sequences, etc.) into a single project file. Even though the manufacturer of a given NLE software application might define a Project as a single non-divisible file, in many cases it is possible to distribute project metadata among multiple Project files that only together will constitute the "Project". Once a user deems a "Project" as consisting of multiple "Project Files", it is possible to contemplate putting these into a structure that allows collaboration.

The solution of the present invention is built upon a unique usage of an underlying feature of the Linux Operating System (and also found in other Unix or Unix-like Operating Systems such as Mac OS-X)—that being the ability of these Operating Systems to create pointers or "links" to files (both "symbolic links" and "hard links"). The inventive system makes extensive use of such links to provide to each workstation that is connected to the server and its centralized storage easy and safe access to shared media files. In essence, the system virtualizes all media files that are designated to be accessible to more than one user and workstation, presenting "links" to the actual files to all workstations and users that are connected to the server (via each user or workstation's own unique directories and network shares), while protecting the actual media files in a completely separate directory that cannot be directly accessed by those users and workstations. That is, "symbolic links" create virtual files that are unique for each user on the system but that point to a common set of true media files that are stored on the networked drive in a folder that ordinarily is never accessed directly by any NLE workstations. From the point of view of the NLEs, these links are indistinguishable from the actual media files—and thus all operations that the NLE would and could normally perform on those files can be performed (even file deletion). However, because the files are really only links, the actual files are at all times protected.

The approach of virtualizing all shared media files in this manner also enables different NLE applications to share media files over a network. File virtualization—in which the same media file could have more than one name, each name being tailored so that it can be recognized by specific NLE applications—enables this cross-NLE compatibility.

A system and method is provided that is platform and workstation brand independent. The only necessity is a Linux (or, equivalently, a Unix or Unix-like) based server. That is, all of the digital video media data file manipulation takes place on the server side in a platform independent manner, thus, allowing many different kinds of editing systems and other devices running on many different platforms to share the same storage space.

In accordance with the foregoing objects and aspects of the invention, there is provided a system, method and computer program product for storing digital audio and video media files in a system having a computer server that is in communication with a means for storing the media files, and that is in communication with one or more independent users. The method comprises the steps of: creating a directory structure on the storage means for hierarchically organizing the digital media and other data files; generating in the directory structure a User Directory that corresponds to each independent user that is capable of accessing the media files, and through which an independent user can store actual digital media files; moving actual stored digital media files from a User Directory to a Shared Directory that is separate from the User Directory where the files are not directly accessible to any independent user; and, creating, for each digital media file moved into the Shared Directory, a corresponding link to the actual digital media file for each individual independent user, and placing the link inside each the corresponding User Directory. In this manner, via the links, a user is permitted indirect access to all actual digital media files that are stored in the Shared Directory on the storage means, while preventing direct access to the actual digital media files.

According to a further aspect of the invention, there is provided a complete tool for managing, via a Graphical User Interface (GUI), a centralized digital media storage system that stores digital media source data and edited data for multiple NLE workstations that implements the symbolic links virtualization feature. This managing tool enables media and corresponding virtual files to be manipulated, e.g., created in a logical location, moved from one logical location to another, shared, refreshed, and deleted in response to user requests, all the while automatically retaining the file virtualization features as described.

It is a further object of the present invention to provide a tool that manages ownership and permissions over different editors' contributions to shared Projects and that implements "symbolic links" to create a virtual file and folder structure that allows multiple non-linear editing systems to collaborate on the same project, keeping work organized so that it is clear which editor is editing what and allowing each editor to maintain his/her own settings for the Project. Further to this object, the tool implements the "symbolic links" virtualization feature to create a virtual file and folder structure for enabling: 1) Multiple editors to open and work with the same shared Non-linear Editing Project when the project is created and shared within a framework established by the tool's manager software; 2) Each editor who is a member of a Shared Non-linear Editing Project to get his/her own User Folder within that Shared Avid® Project; and, 3) When an editor opens the Shared Project, he/she sees his/her own User Folder at the top level of the "Shared Project" structure. There is provided another folder called "Other Editors" inside which are found the User Folders of all other editors who are members of the Shared Project. The "symbolic link" structure makes it possible for each editor to have a customized view of the Shared Project, in which their own User Folder is at the top level, and all other editors' folders are at a lower level that can be collapsed into one "Other Editors" folder.

Advantageously, the present invention may be implemented for other non-linear video editing applications, and operates to enable multiple editors to collaborate and share in video editing projects either with or without implementation of the virtualization feature.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
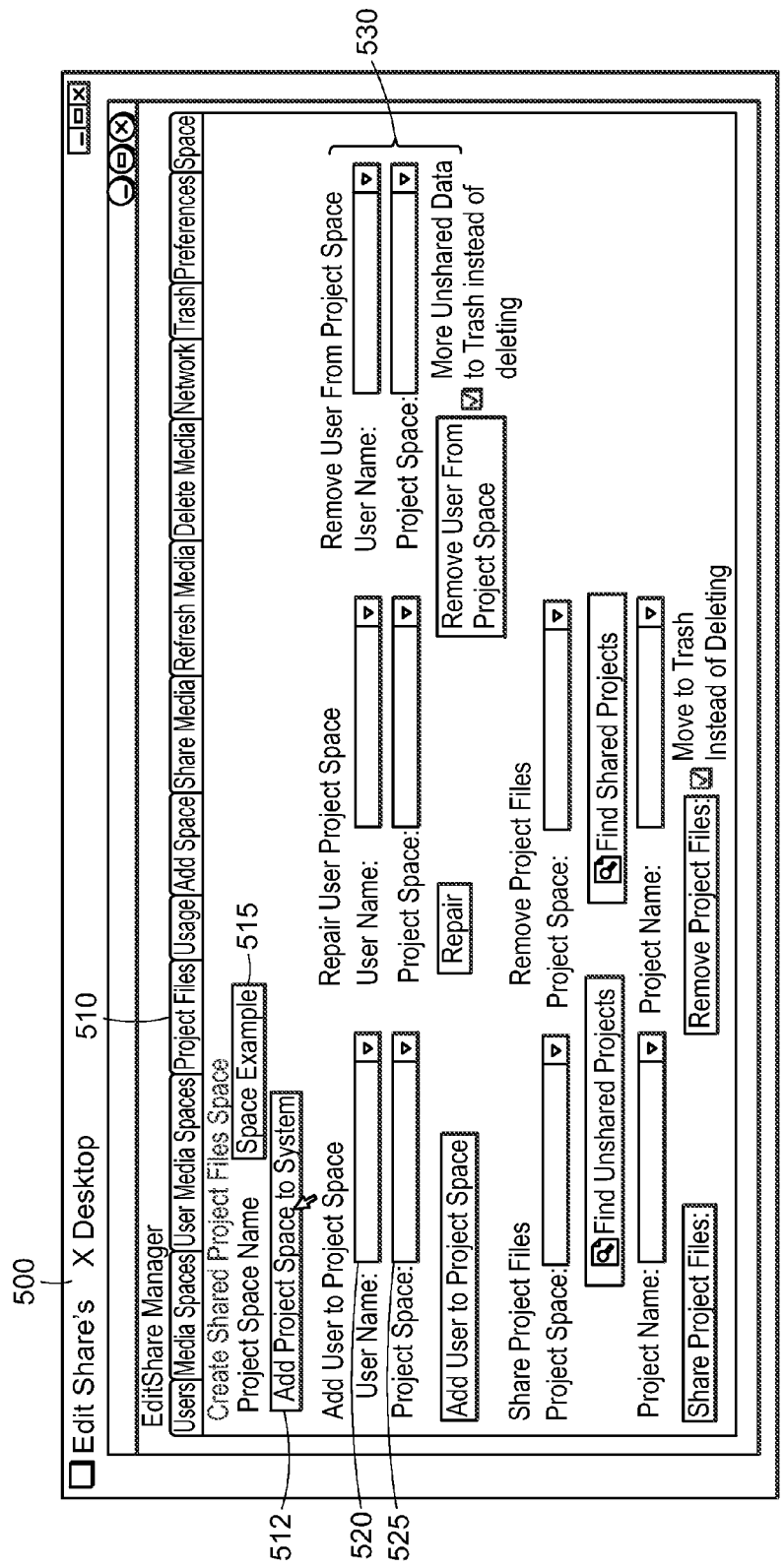
FIG. 1 depicts a novel GUI 500 via which an administrator may create a "shared" non-linear video editing project according to the invention.

The present invention is a system and method that enables an NLE system such as, Apple's Final Cut Pro® video editing program, that natively provides a scheme for storing a video editing "Project" as a single "monolithic" file, to be used in a collaborative editing environment. Under normal and generally accepted practice, when using such NLE programs and storing their Project data, it is not possible to give different editors control over different parts of the same Project because at the filesystem level of a computing environment, those NLE applications define Projects as the metadata contained in just one single file.

That is, unlike the AVID® Non-Linear Video Editing application whose "Projects" are comprised of metadata that includes bins and sequences and "clips" that all refer to discrete media files that can be manipulated individually and assigned write permissions differently, and whose created Project data is not stored in single monolithic files, Apple's Final Cut Pro® stores all its bins in a single file.

As referred to herein, a bin file is the "smallest atom" of information that a NLE such as Avid creates in order to save metadata about a project. Such metadata can include: "master clips" (references or pointers to original audio and video files captured in their entirety); "subclips" (uniquely named references or pointers to portions of original audio and video files); "sequences" (references to master clips and/or subclips arranged in such a way that they can be played back in sequential order to create a video program that appears continuous but that in fact is made up of many little components and layers); "sub-sequences" (copies of portions of sequences that can be renamed and reused instead of or in addition to the original sequences); "rendered effects" (references to files created after applying effects filters such as color correction, slow motion, dissolves or other transitions that cannot be played back in realtime without rendering the effects to new files).

The fact that Avid® NLE video editing Projects can be divided up into multiple bins, plus the fact that each bin is a real file at the filesystem level, the system described in United States Patent Publication No. 20060184673 A1 is configured to enable the setting and controlling the owernship and Read/Write versus Read-Only permissions of bin files, thereby providing the infrastructure for multiple editors to work collaboratively on a single Project. In effect, Avid®'s bin scheme makes it possible to give different editors control (i.e., write access) over different portions of a single Project. That is, as some NLE programs such as Avid® Projects are typically divided up into many bin files, the centralized collaborative storage system for non-linear editing systems and other devices sets up a file directory and symlink scheme that allows ALL editors who were "members" of a Project Space to see all the bins created by all other editors, but controlling the WRITE ACCESS to the bins according to whose "User Folder" the bins resided in, i.e., a user-based locking scheme is provided to allow safe control over who can and cannot write to a file.

Thus, there is provided a software program executed by a processor to provide a graphics interface and file management features configured to avoid the limitations of the Final Cut Pro® project file structure by creating an environment on a data storage system that can support collaborate editing, just as the environment created for Avid® NLEs.

That is, while Final Cut Pro® NLE application stores all its bins in a single file, and thus individual Final Cut Pro® bins cannot be assigned different ownerships and permissions (without modifying the application itself), Final Cut Pro® does allow editors to open up many entire Projects simultaneously. Thus, according to the invention, Final Cut Project files (or other single monolithic NLE Project files) are treated as if they are "Bins", such as provided in the AVID NLE scheme, and an environment is provided in which a Final Cut Pre "Project" may be defined as of a top-level directory called the "Project Name" with multiple Final Cut Project Files organized into User Directories stored underneath. Further, with careful control on ownerships and permissions, a collaboration infrastructure is provided.

In one embodiment, as will be described in the greater detail herein below, there is described a collaborative editing environment on a centralized data storage system in which a NLE video application that natively saves projects as a single monolithic file, such as provided by Final Cut Pro® NLE application, can be adapted such that multiple editors can work collaboratively with the Final Cut Pro® application and effectively have shared projects. The collaborative video editing environment on a centralized data storage system is further equipped with a tool for creating on the centralized data storage system a "Shared Final Cut Project" (or alternately, a Shared Project Space) to which users could be added, defining who has access to that Project Space. Further, the collaborative video editing environment on a centralized data storage system is equipped with a tool for creating in a given Shared Project Space one or more upper-level folders, each of which can be defined as unique "Shared Final Cut Project" and into which editors can put Final Cut Project Files that represent some portion of an overall Project. Moreover, in such a collaborative editing environment on a centralized data storage, there is provided a mechanism for controlling the permissions and ownership of the Final Cut Project Files such that multiple users cannot overwrite each other's work.

Further provided is a collaborative management tool that creates inside each "Shared Final Cut Project" a directory structure comprising:

a User Folder for each member of the Shared Project Space in which any files stored there are only writable by that user, an Unprotected Project File folder that is writable by any user and that allows users to easily pass Final Cut Project Files from one user to another; and a Group Project Files Folder that provides a place where users can organize Project Files not only according to a "User", but by any means desired—e.g., by subject or date—and a place where all files are always maintained in a Read Only state for all users.

There is additionally provided programmed functionality by which each user gets his/her own view of the Shared Project Space and Shared Final Cut Projects contained therein, such that their own User Folder is visible at the top of each Shared Final Cut Project, such that all other User Folders are visible inside a folder called "Other Users".

There is additionally provided programmed functionality to provide a GUI Interface (i.e., Final Cut Project Browser) that runs on the Macintosh OS X platform that can display the folder and file hierarchy of one or more Shared Projects Spaces. The GUI interface is configured to enable editors to: 1) open up Final Cut Project files by a "double clicking" selection; 2) warn editors when they are opening up a Read Only file; 3) warn editors when they try to drag a file from their own User Folder to another editor's User Folder that this action cannot be completed; 4) drag Final Cut Project files into the Group Project Files folder, a file movement that would normally be impossible at the level of the workstation's filesystem because the Group Project File folder is Read Only. Similarly, the GUI interface must allow users to drag Final Cut Project files out of the Group Project File folder; 5) allow editors to create, name and rename new subdirectories in the Group Project Files folder; 6) reorganize any Final Cut Project files stored in the Group Project Files folder; and, 7) allow editors to "give away" their own Project Files to other users. Again, this is an action that would normally be illegal at the workstation filesystem level because users normally do not have write access to other user's folders; and 8) provide editors with a margin of time to undo giving away their Project Files.

The following description, while referring specifically to a collaborative editing system for manipulating Avid® Projects, is now expanded and described in greater detail with additional emphasis on its use for enabling one or more editors running a non-linear video editing (NLE) program to collaborate on Projects despite the fact that the program (such as Apple's Final Cut Pro editing application) natively saves projects as a single monolithic and non-divisible Project File.

FIGS. 1-13 particularly depict how the tool for managing the centralized storage system further provides the ability to create a special environment where non-linear video editing Projects can be shared by multiple editors such that 1) the work of each editor is easily accessible to colleagues on a Read Only basis—that is, it can be viewed and duplicated, but not changed; 2) editors working in a Shared Project can completely hide some work from colleagues; 3) editors each get their own customized view of the Shared Project; 4) editors can cede Write Authority to colleagues by moving their work to an unprotected area; 5) each editor maintains his/her own Settings files for the project, as well as statistics and trash bins.

FIG. 1 in general depicts an embodiment of the system administrator GUI 500 via which functionality is initiated for enabling management of the centralized shared storage systems for collaborative non-linear editing and management of Avid® "Projects" according to a further aspect of the invention. Via interface 500, selection of the "Project Files" tab 510, enables an administrator to create an environment on the centralized shared storage system that can support a "Shared Project". First, via interface 500, selection of button 512 enables an administrator to create a project "space" on the system server to contain the project. In the exemplary interface 500 of FIG. 1, the defined space is given a name by the user via entry field 515. It is understood that this "space" is just a standard Linux directory, however, any normal Project created in this directory is detected by the shared Project enabling software provided by the tool.

There is no practical limit to the number of individual "Shared Project" spaces that can be created on a server. Each space can have a different group of editors assigned as "members" of the space. Thus, different configurations of groups can share different Projects. FIG. 1 depicts generally the entry fields 520 and 525, respectively enabling the addition of an editor (user) to a Project Space. Each entry field 520 and 525 is provided with a respective drop-down menu enabling selection of available users and created Project spaces. Just as easily as users (e.g., editors) may be added, users may be removed from any Project Space at any time via the interface via drop-down menu choices for entry fields 530 enabling selection of users to be removed from any Project space.

Figure 2A:
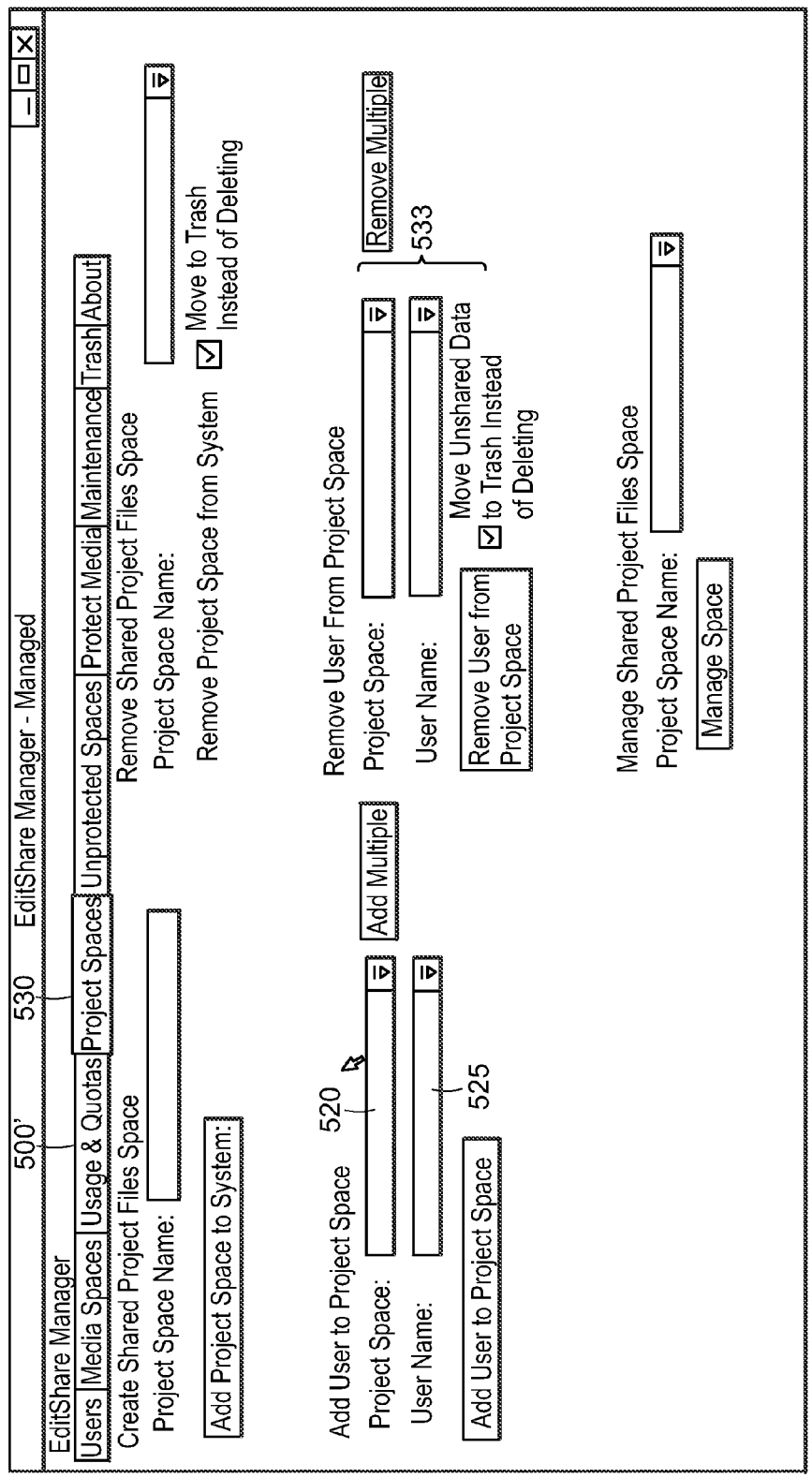
FIG. 2A depicts a GUI on a Storage Server modified to enable one or more editors running a non-linear video editing (NLE) program to collaborate on Projects that consist of a collection of what were designed to be monolithic project files.

FIG. 2A depicts a GUI on a Storage Server modified to enable creation of a Shared Project Space for a Project file, e.g., Shared Final Cut Project. In the example embodiment, FIG. 2A shows the example GUI 500' including a "Project Space" tab 530 for creating a new Project Space enabling editing collaboration for editors running a non-linear video editing (NLE) program to collaborate on Projects, despite the fact that non-linear video editing program natively saves projects as a single monolithic and non-divisible file. Generally, entry fields enable the addition of an editor (user) to a Project Space with each entry field 520 and 525 provided with a respective drop-down menu enabling selection of available users and created Project spaces. Just as easily as users (e.g., editors) may be added, users may be removed from any Project Space at any time via the interface via drop-down menu choices in additional entry fields 533 enabling selection of users to be removed from any Project space.

Figure 2B:
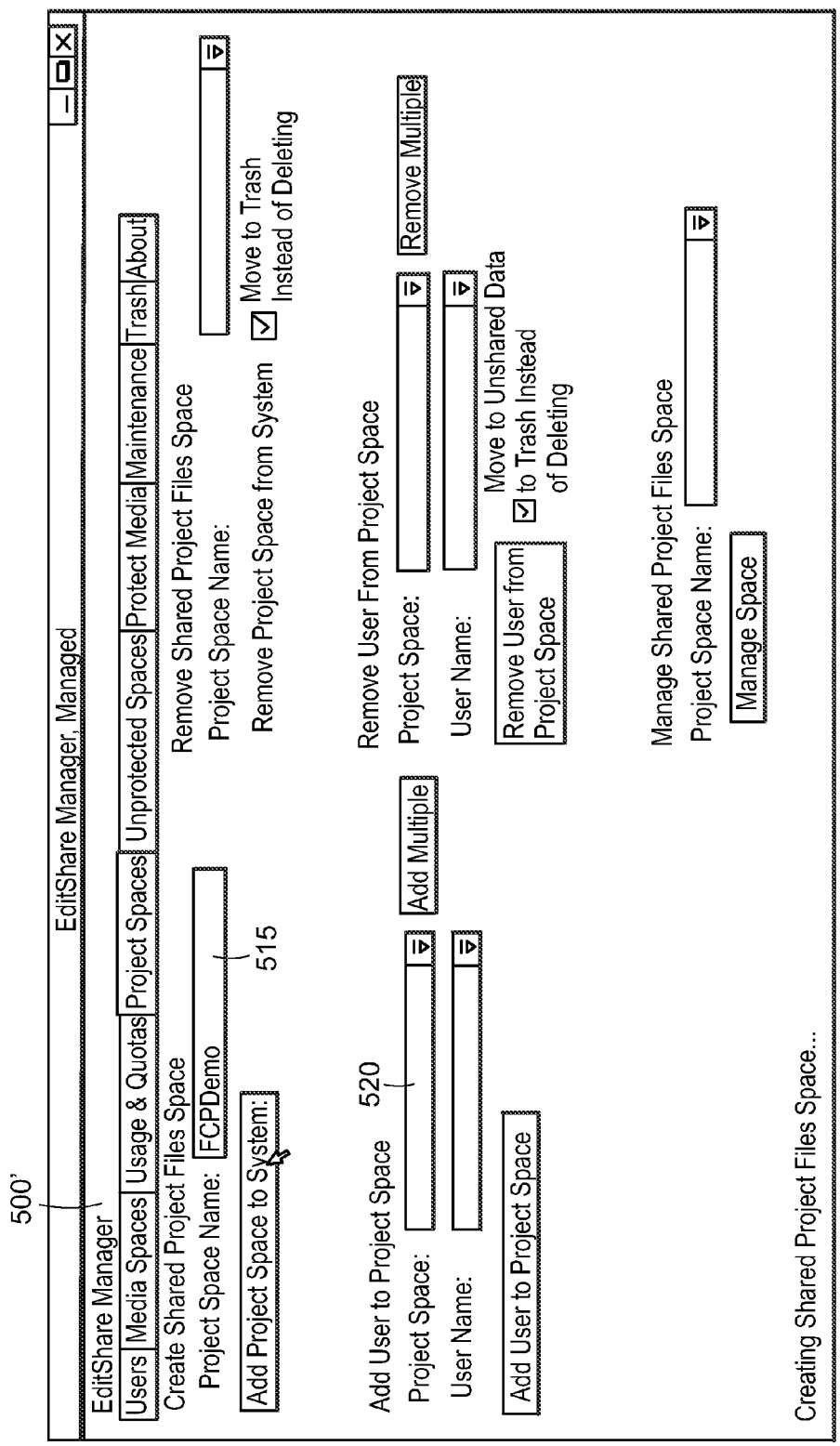
FIG. 2B depicts via the GUI 500' on the Storage Server a user creating a Shared Project Space.
Figure 3:
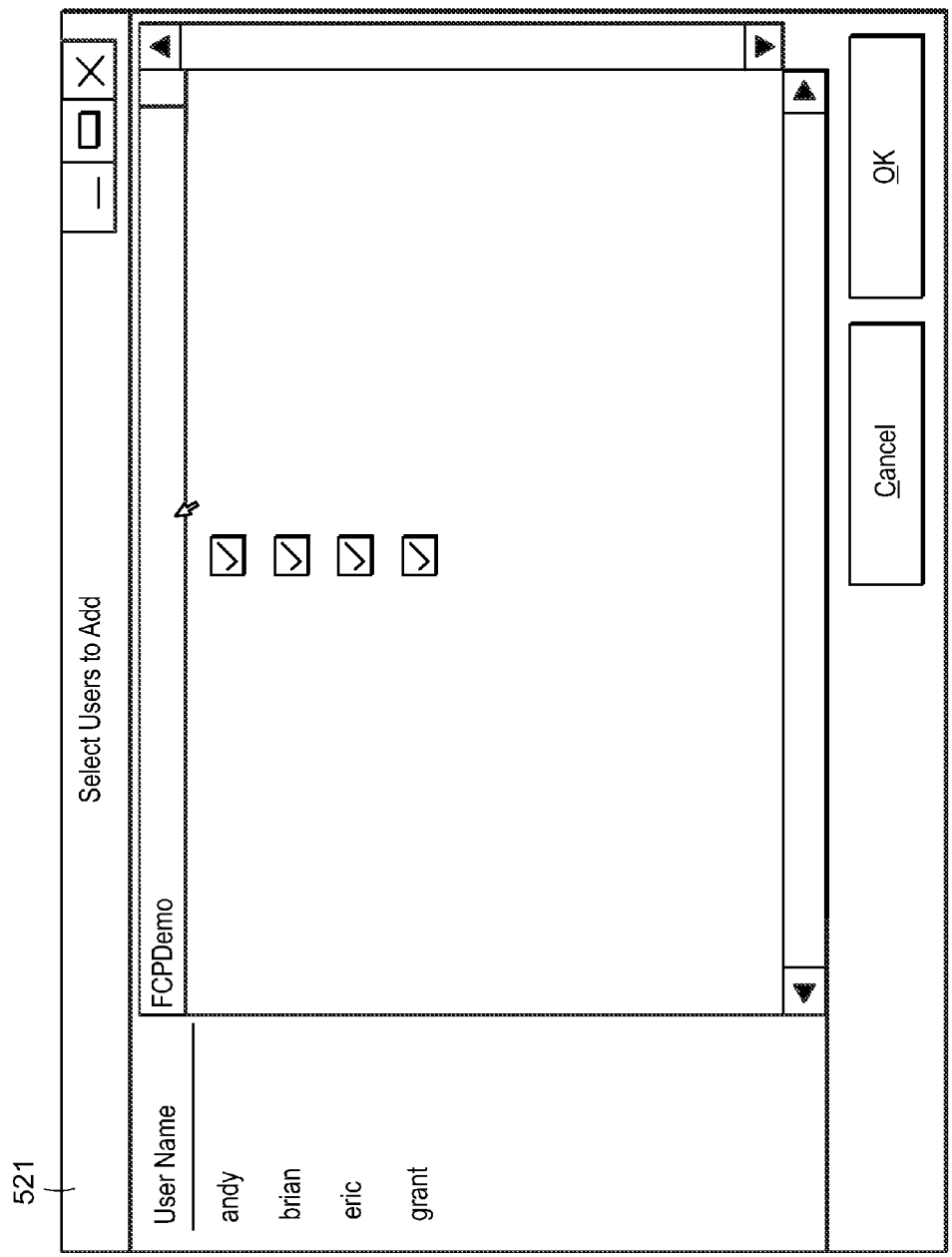
FIG. 3 depicts, in response to selection of drop-down menu enabling selection of available users, an example GUI popup interface box 521 showing selection of Users (editors) to be added to the Shared Project Space "FCPDemo"

As shown in FIG. 2B, as an example, the GUI 500' on the Storage Server depicts a user creating an example Shared Project Space called "FCPDemo" as shown via user entry field 515. Further, as shown in FIG. 3, in response to selection of drop-down menu enabling selection of available users, there is depicted an example GUI popup interface box 521 on the Storage Server showing an administrator selecting the Users (editors) who are desired to be added to the Shared Project Space "FCPDemo". For each person who is added to this Project Space (and added to any Shared Final Cut Project), the server application creates a User Folder. If a User needs to be added here AFTER the creating a Shared Final Cut Project, the system will add a folder to every Project that already exists.

Figure 4:
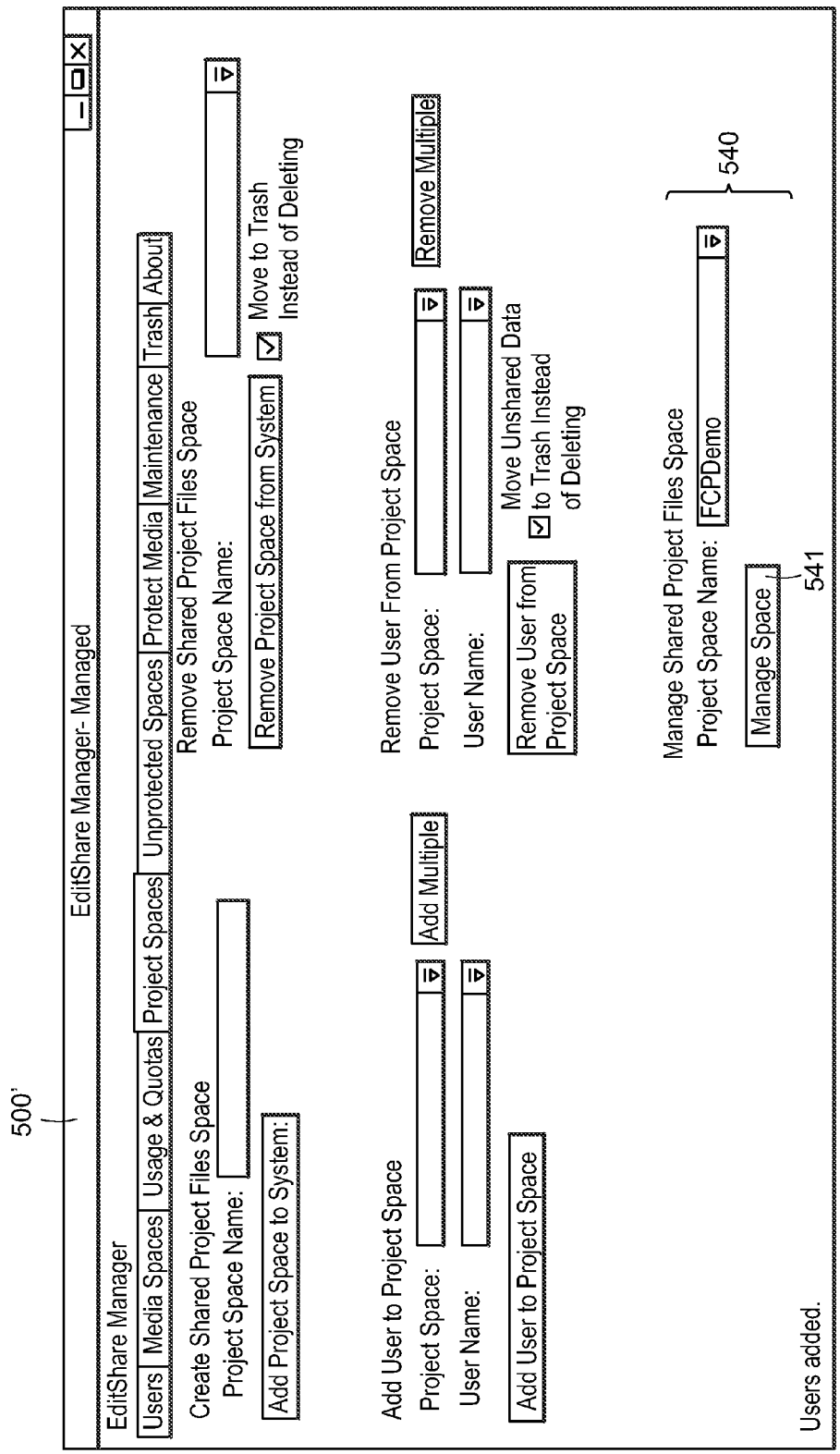
FIG. 4 depicts the GUI 500' having entry fields 540 enabling management of a shared project space, and particularly, creation of an upper level directory that will define a new "Shared Project" in the newly created Shared Project Space.
Figure 5A:
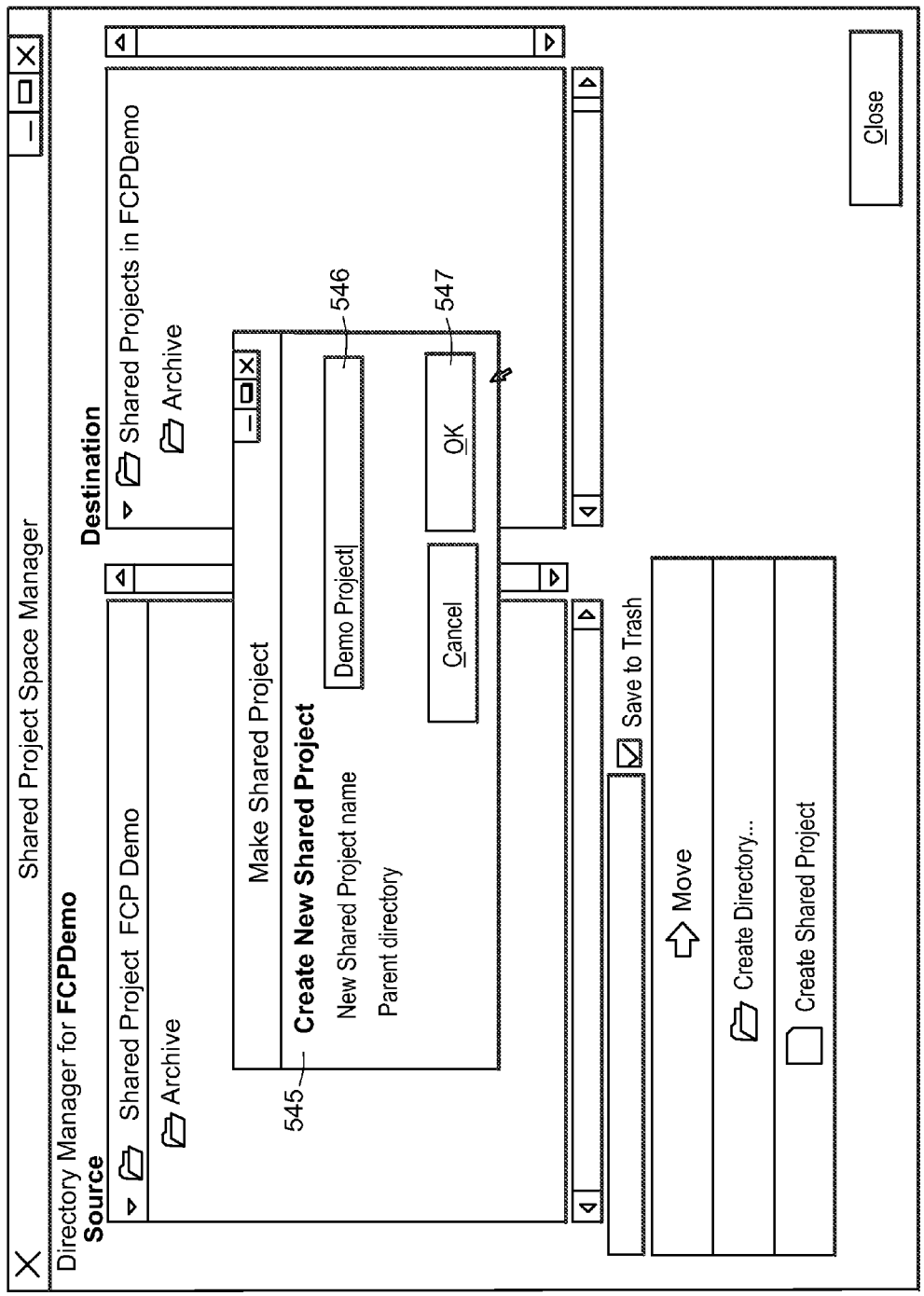
FIG. 5A depicts, in response to selection of the election box 541, a displayed popup box enabling a user to create the upper level directory that will define the new "Shared Project" in newly created Shared Project Space; and, FIG. 5B depicts the availablility (source) of the newly created Shared Project Space called "FCP Demo" 548a that can be mounted to a destination 548b.
Figure 5B:
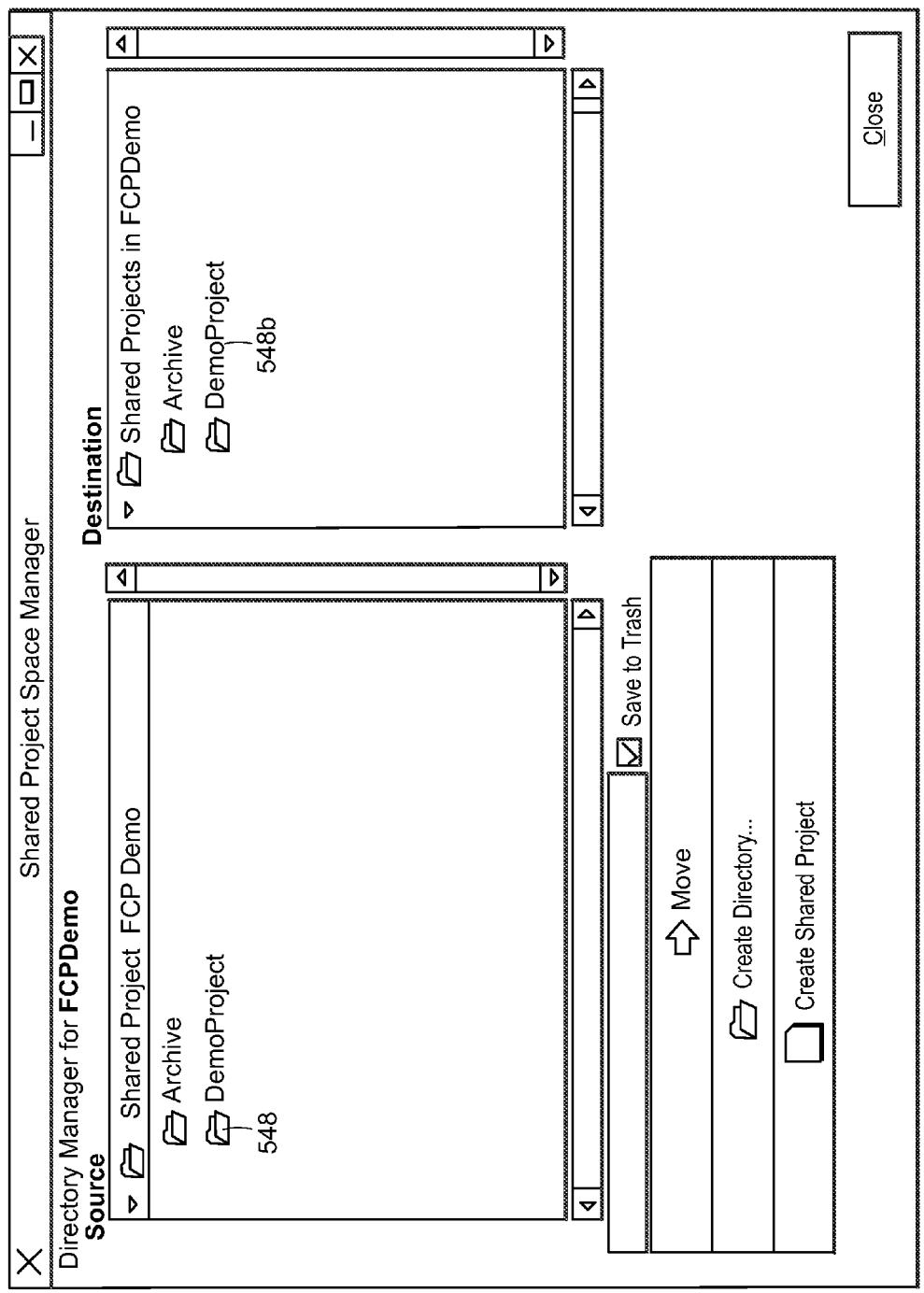

FIG. 4 depicts the GUI 500' generated via the Storage Server having entry fields 540 enabling an administrator to manage a shared project space, and particularly, create an upper level directory that will define a new "Shared Final Cut Project" in the newly created example "FCPDemo" space. Clicking on selection box 541 will open up a popup box for enabling a user (administrator) to create the upper level directory that will define a new "Shared Final Cut Project" in the "FCPDemo" Shared Project Space. In the example described herein, responsive to selection of the election box 541, a popup box 545 is displayed as shown in FIG. 5A, where a user can create the upper level directory that will define the new "Shared Final Cut Project" in the "FCPDemo". In the example, the new Shared Final Cut Project entered in field 546 is named "Demo Project". As shown in FIG. 5A, by selecting the Okay button 547, a new folder, e.g., folder "Demo Project", is created as shown in FIG. 5B depicting the availablility (source) of the newly created Shared Project Space called "FCP Demo" 548*a* that can be mounted to a destination 548*b*.

Figure 6:
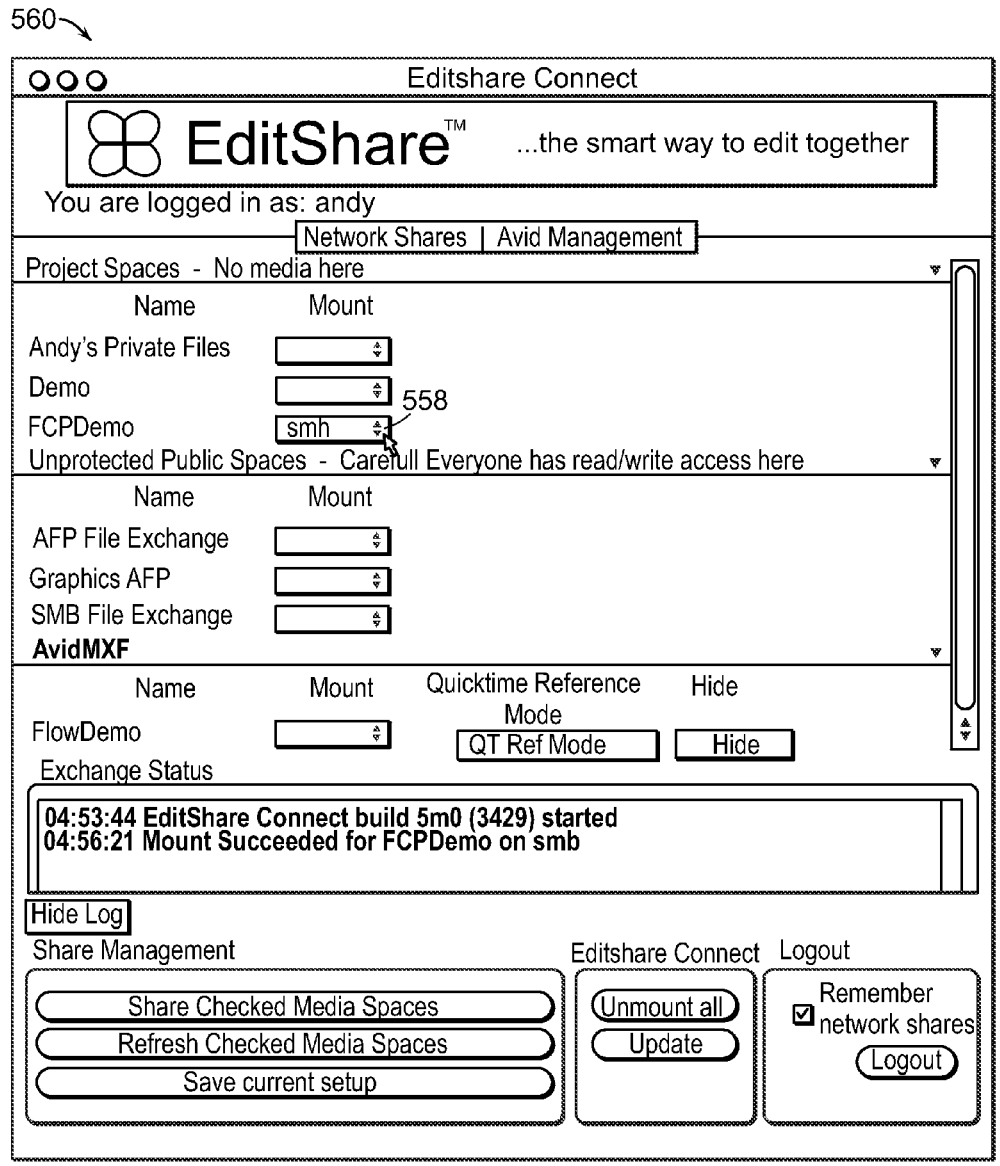
FIG. 6 depicts a graphic interface that enables the mounting of the newly created Shared Project Space to a user's destination workstation.

FIG. 6 depicts an example "Shared Project Space" manager interface 560 generated on a Macintosh OS X computer, that permits users to log into the system server and browse resources that can be mounted on a user's workstation. FIG. 6 particularly depicts, in the example Shared Project Space called "FCPDemo", a manager interface 560 that enables the mounting of the newly created Shared Project Space called "FCP Demo" 558 to a user's destination workstation.

Figure 7:
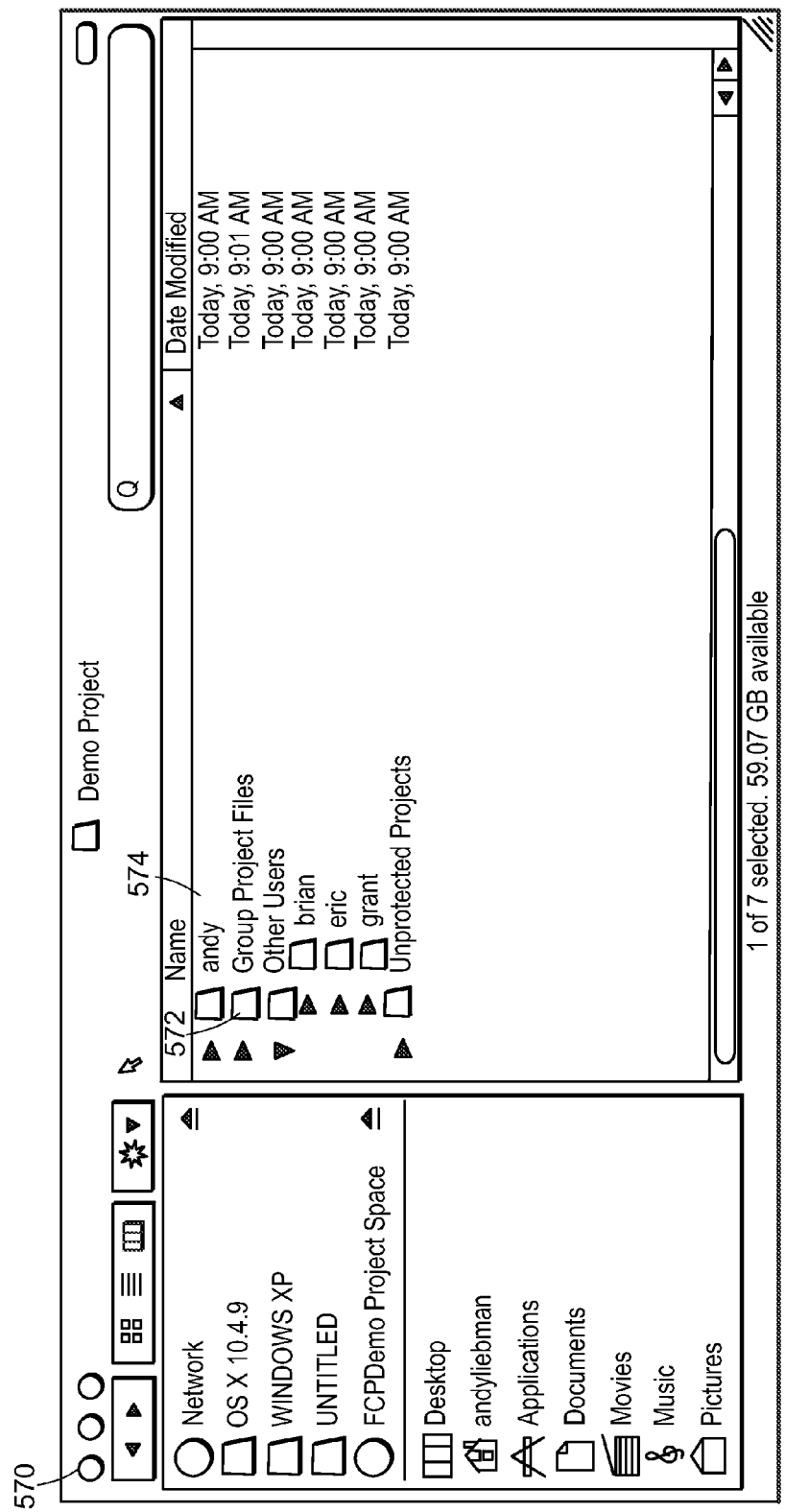
FIG. 7 depicts an interface showing an example OS X Finder (file manager) view after mounting the Shared Project Space.
Figure 8:
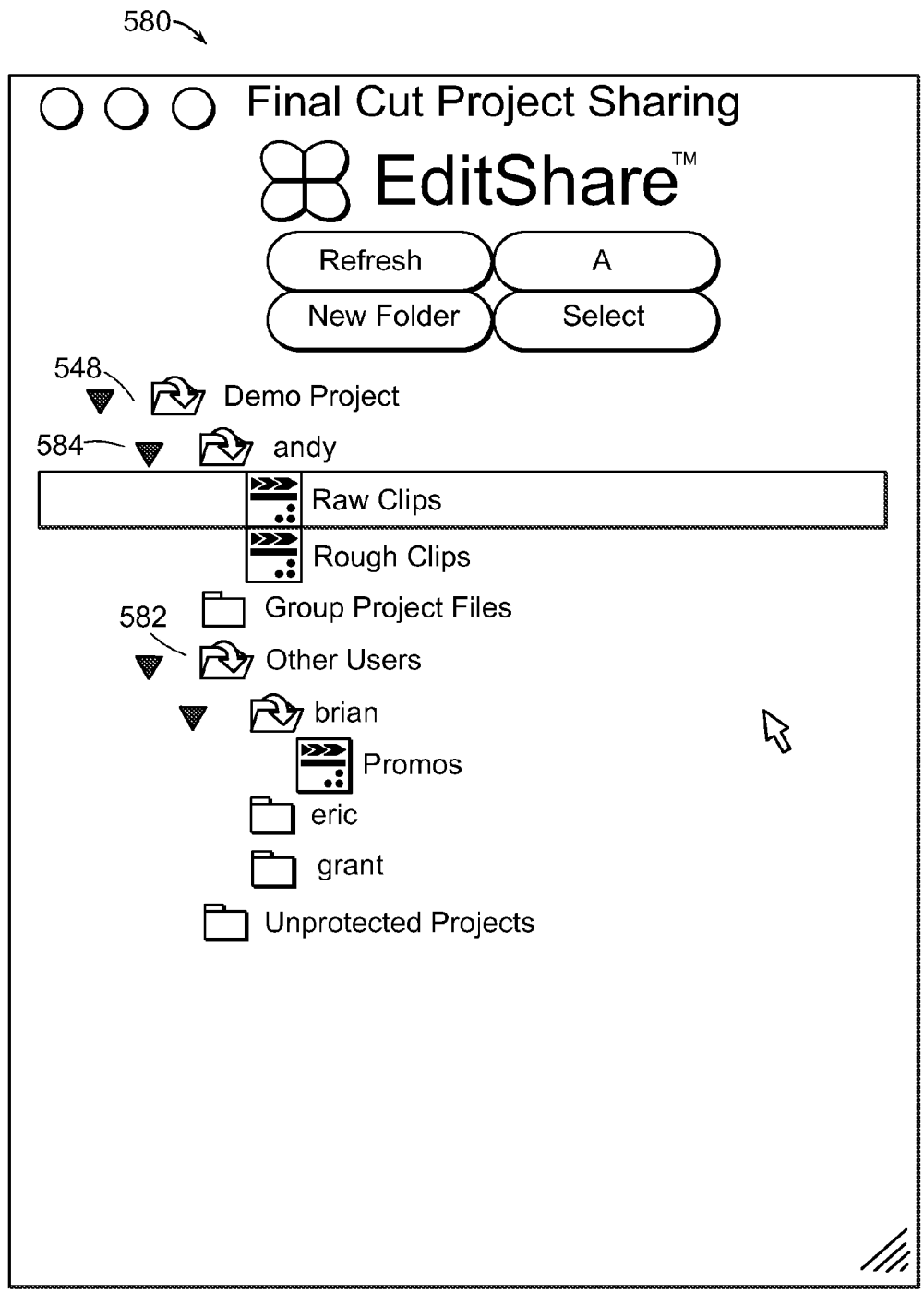
FIG. 8 depicts an example Project Sharing browser interface 580 provided by a collaborative editing server that presents the Shared Project.

After mounting the Shared Project Space "FCP Demo", FIG. 7 depicts a directory structure interface 570 generated in the OS X Finder (file manager). It can be seen that each user has his/her own User Folder in the Shared Project Space called "FCPDemo". The logged in user "Andy" 574 sees his folder at the top. Other users are seen in a nested folder called "Other Users" 572. Likewise, FIG. 8 depicts a screenshot showing the system's Final Cut Project Sharing browser interface 580 that presents the Shared Final Cut Project "Demo Project" 548. As in FIG. 7, it can be seen that each user has his/her own User Folder in the Shared Project. The logged in user "Andy" sees his folder 584 at the top of the directory structure with other users seen in a nested folder called "Other Users" 582.

Figure 9:
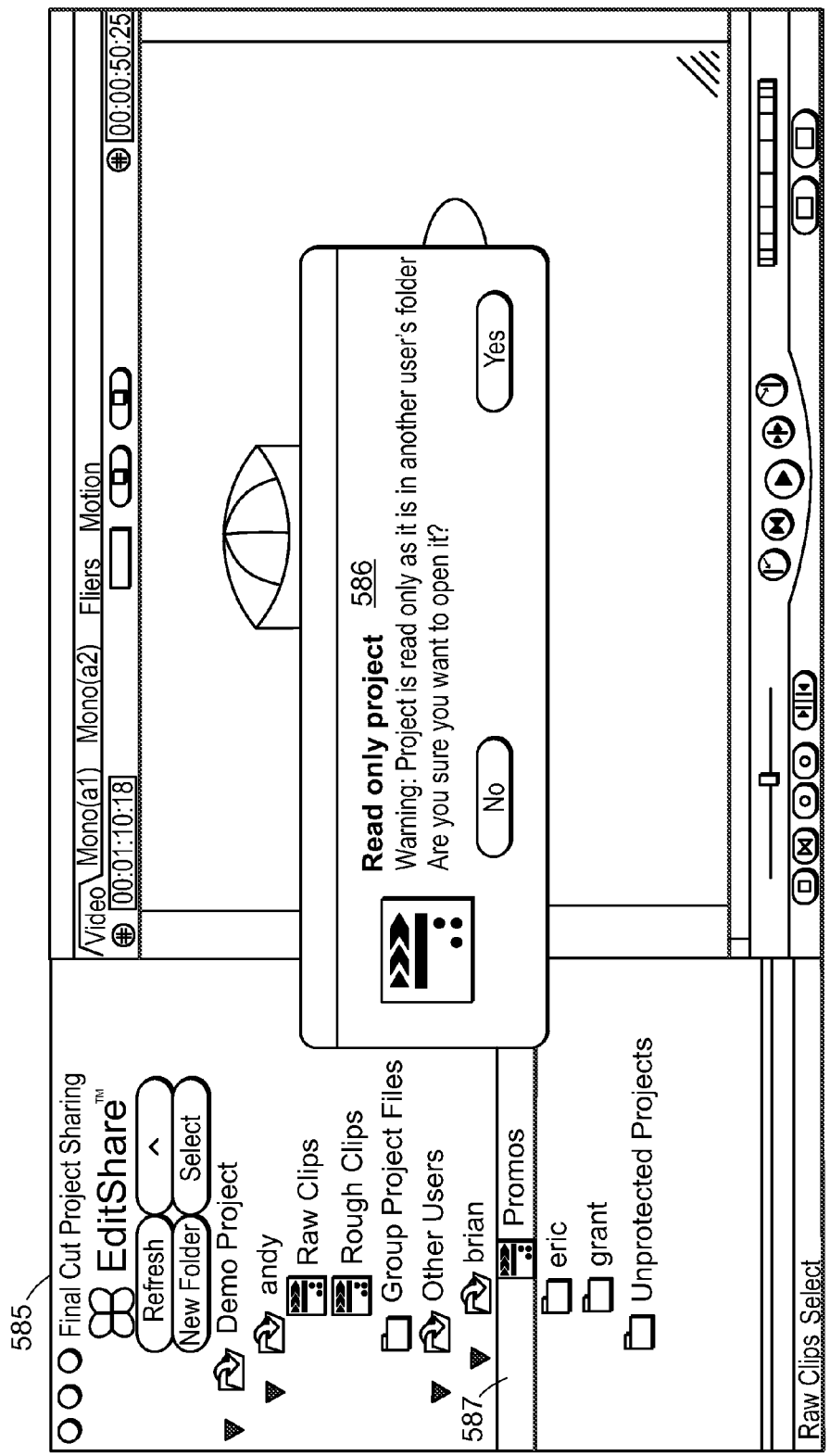
FIG. 9 depicts an example interface generated by the system file sharing browser that depicts the user "andy" opening the "Promos" Project File that is under the control of the user "brian"

FIG. 9 depicts an example interface generated by the system file sharing browser that depicts the user "Andy" opening a file project 587 (e.g., a "Promos" Project File) that is under the control of the user "brian". Before opening the file, the Final Cut Project Sharing browser interface warns user "Andy" that the project file is "Read Only" as depicted by pop-up warning box 586.

Figure 10:
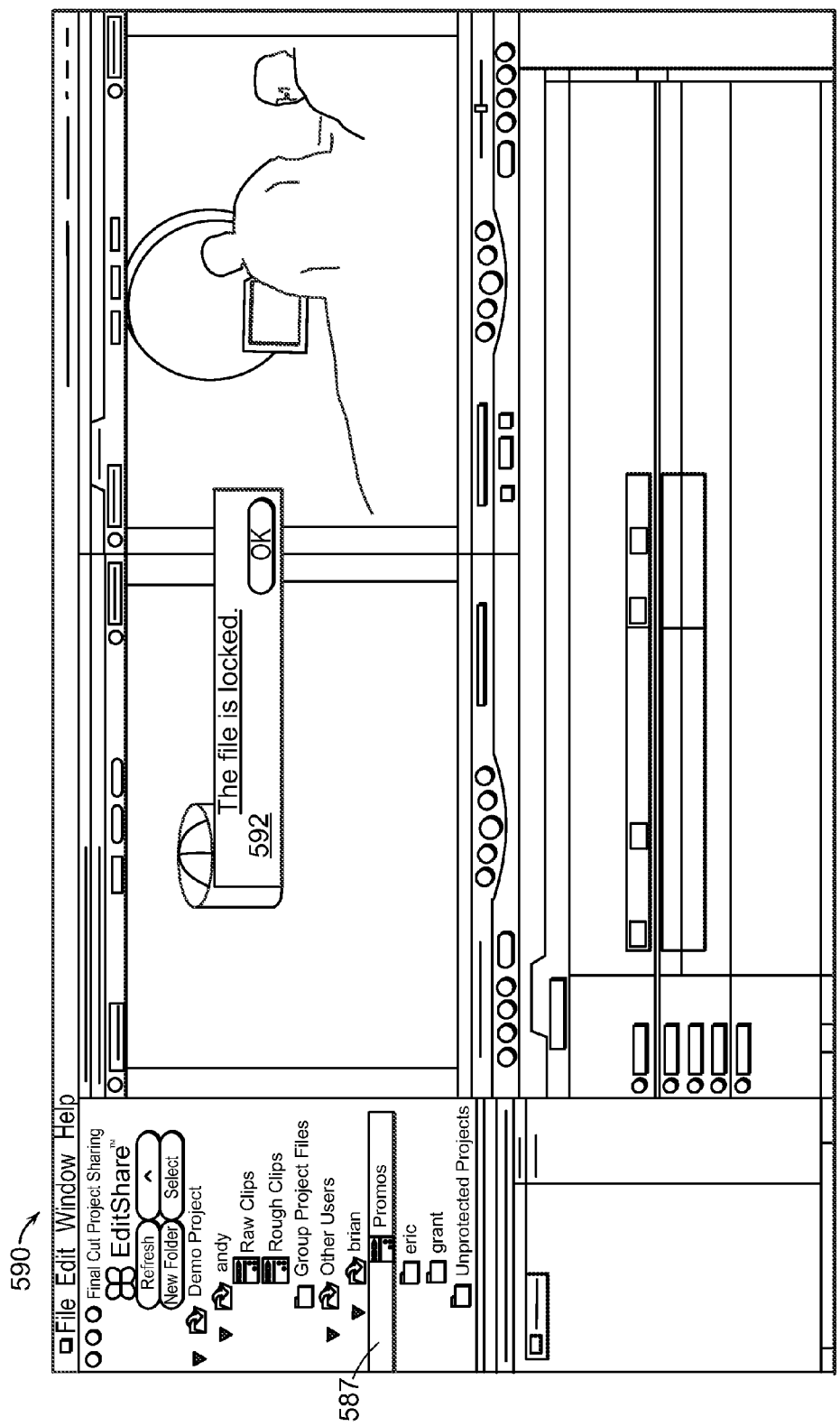
FIG. 10 depicts an example interface generated by the system file sharing browser that depicts the user "andy" trying to modify the "Promos" Project File that is under the control of the user "brian"

FIG. 10 depicts an example interface generated by the system file sharing browser that depicts the user "Andy" trying to modify the "Promos" Project File 587 that is under the control of the user "brian". In accordance with the permission and settings as set in the example scenario, Andy can look, but if he makes a change to the Project File (for example, by modifying a sequence stored there) and then tries to save the change, the system generates for Andy a message 592 saying the File is Locked".

Figure 11:
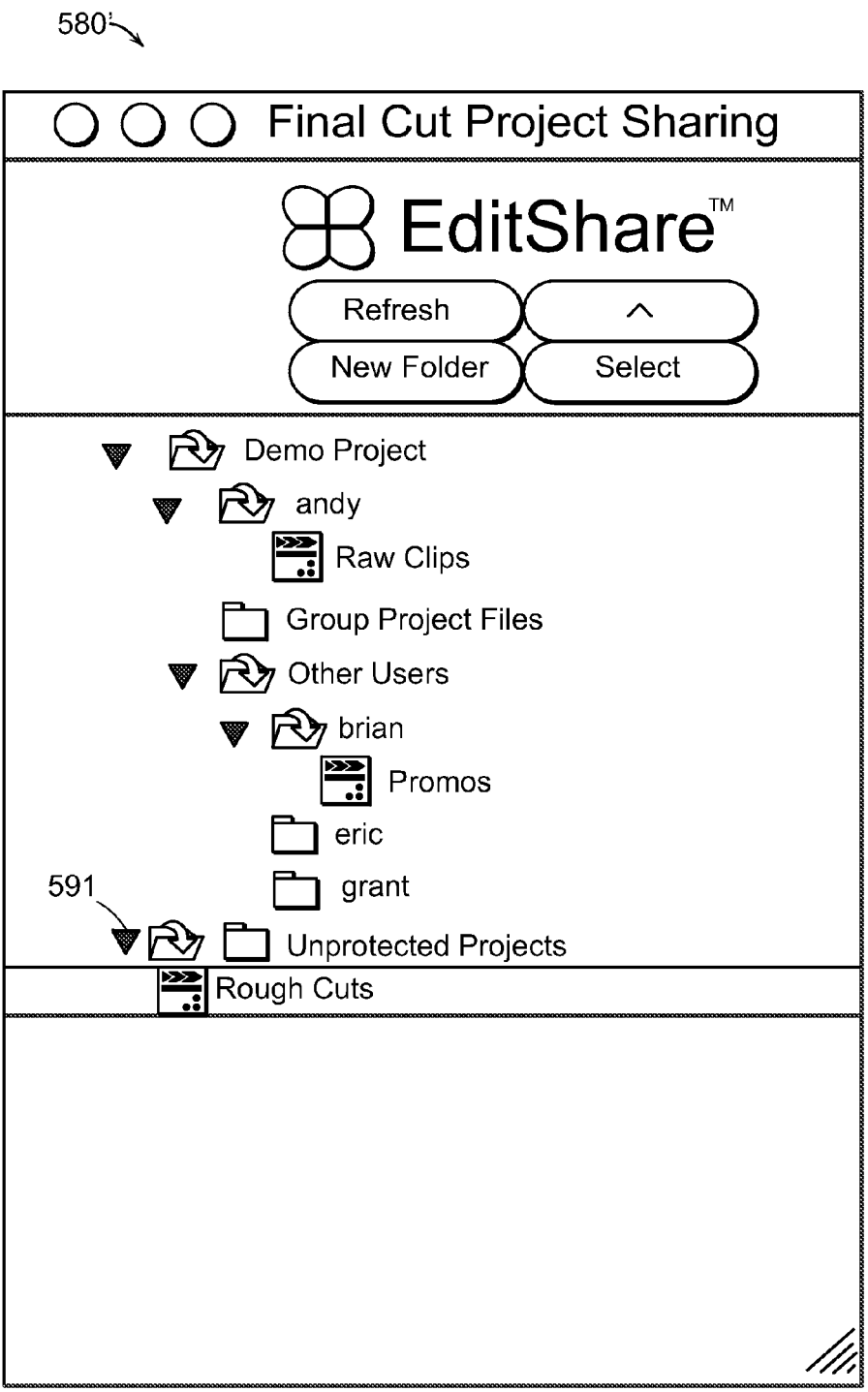
FIG. 11 depicts a screenshot showing the system's Project Sharing browser interface generated and presented to the example user "Andy" to illustrate how the user "andy" is able to freely move Final Cut Pro Project Files in and out of Unprotected Projects.

FIG. 11 depicts a screenshot showing the system's Final Cut Project Sharing browser interface 580' generated and presented to the example user "Andy" to illustrate how the user "Andy" is able to freely move Final Cut Pro Project Files in and out of the folder Unprotected Projects 591. User Andy can also do the same with "Group Project Files". Whereas the "Unprotected Projects" folder is completely Read/Write for all users, the "Group Project Files" folder is completely Read Only for all users. This means that when Andy moves a file into or out of Group Project Files, the Final Cut Project Browser 580 actually instructs the move to be executed on the Server.

Figure 12:
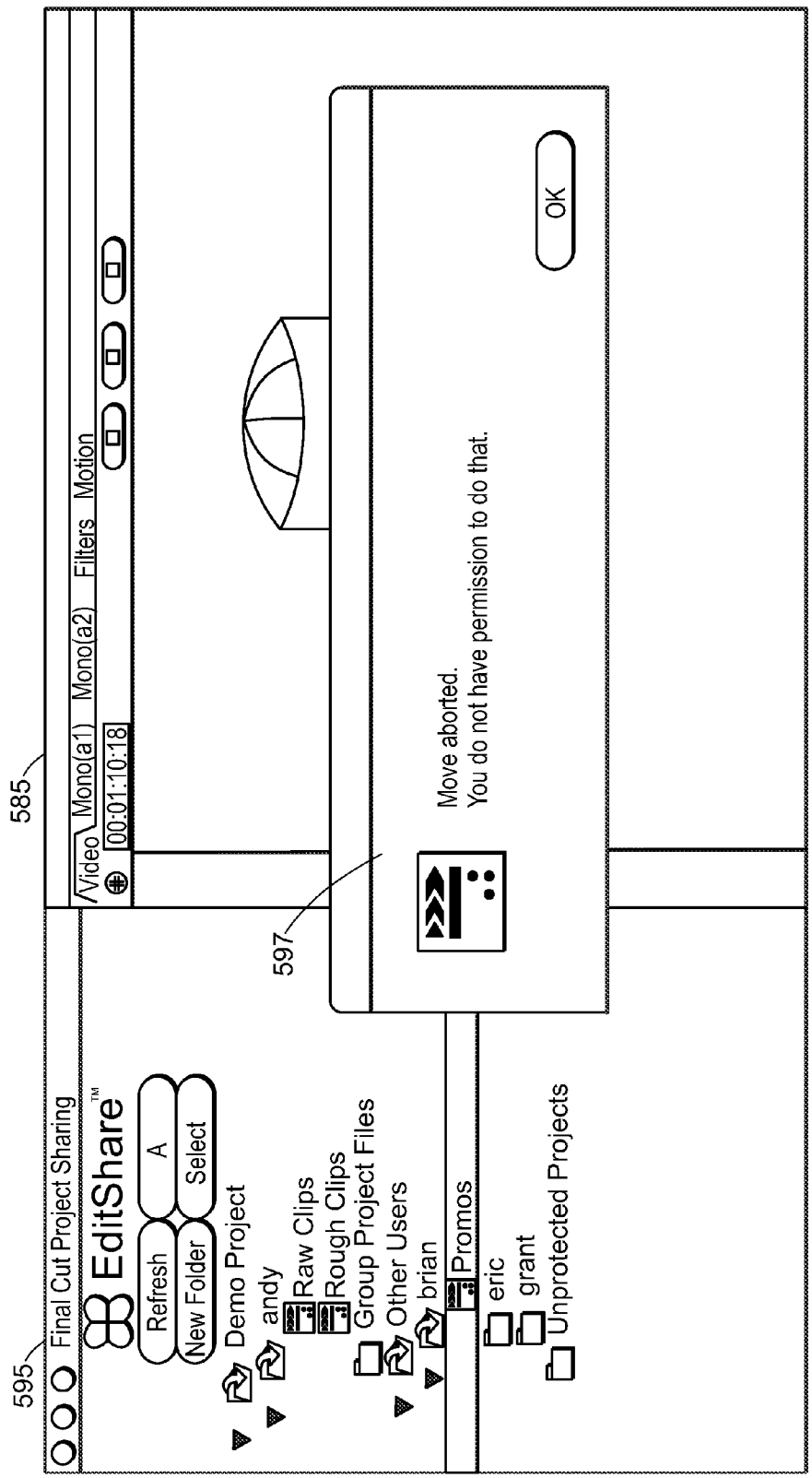
FIG. 12 depicts an example interface generated by the system file sharing browser that depicts what happens if the user "andy" tries to take the "Promos" Project File away from the user "brian"

FIG. 12 depicts an example interface 595 generated by the system file sharing browser that depicts what happens if the user "Andy" tries to take the "Promos" Project File away from the user "brian". The Final Cut Project Sharing browser will popup an error message 597 saying that user Andy "does not have permission to do that".

Figure 13:
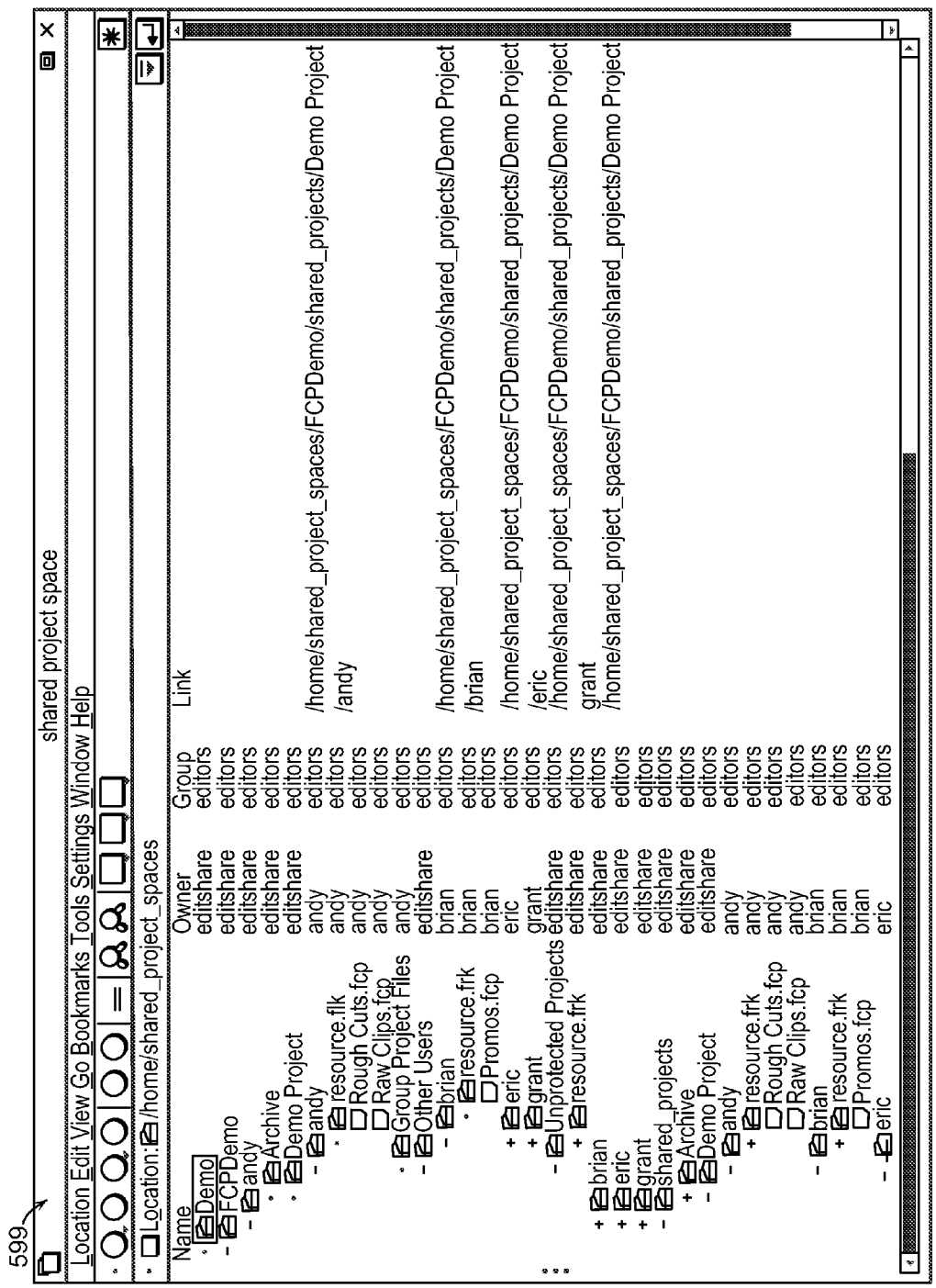
FIG. 13 depicts an example view of a Final Cut Pro Shared Project from the point of view of the Linux filesystem; and, FIG. 14 depicts a base architecture and exemplary computer environment for implementing the server-side file virtualization feature according to the invention.

FIG. 13 depicts an example view of a Final Cut Pro Shared Project from the point of view of the Linux filesystem 599. It is seen that each User folder is "owned" by the specified user, and each Project File (i.e., Raw Clips, Rough Cuts, Promos) is owned by the user in whose folder it is situated. As users move files around, the permissions and ownership of files is always adjusted automatically, as now described.

Particularly, in view of recent developments in the Linux kernel, the system is programmed to "watch" a directory structure, and that enables the system to be notified of any new file or directory added to the structure, and to be notified of any changes to any existing file or directory in the structure, such that the system software can then set the permissions, ownerships, extended attributes and ACLs on the files and folders to ensure that only the owner of a User Folder can write to or modify files inside his/her User Folder, or add or delete files from inside his/her User Folder, to ensure that files or folders put in "Unprotected Folders" can be moved, deleted, and modified in any way by all users; and to ensure that files or folder put into the "Group Folder" are Read Only to all users.

Both Avid and Final Cut Pro Project Sharing are additionally programmed to implement the following functions:

A function for creating a new subfolder, e.g., called "EditShare Group Bins" (in the case of Avid) or "EditShare Group Project Files" (in the case of Final Cut), for each new Shared Project;

A function for creating a new "File Manager Browser" (similar to the existing Final Cut Pro Project Browser) created for use with Avid Applications that allows a group of new functions to be controlled by the Editshare Server that would otherwise be impossible to achieve at the filesystem level;

The same new group of functions have been added to the existing Final Cut Pro Project Browser that sits outside the Final Cut Pro application;

The new functions include:

1) A function for allowing an editor (i.e., UserA) to drag a file that he/she controls into another editor's User Folder, effectively allowing a user to "give away" a file or bin that he/she controls; upon giving away a file or bin, automatically associated with permission such that the file now belongs to the "receiving User" and becomes read-only to the old user.

2) A function for allowing an editor a predetermined amount of time, e.g., 10 seconds, to undo "giving away a file" if he/she discovers the wrong file was moved, or it was moved to the wrong location;

3) A function for allowing editors to drag files that they control into the new "Group Bins" or "Group Project Files" folders. Upon placing a file in one of these new folders, a watchdog function (a Linux Kernal function such as "iNotify" file system event-monitoring mechanism included in the Linux™ kernel that responds and takes action in response to file system events) running on the collaborative editing server automatically changes ownerships and permissions on the file such that the file is read-only for all users (including the original owner), thereby permitting:

i) a function that enables editors to rearrange the files into "subject matter subfolders" within the "Group Bins" or "Group Project Files" folder;

ii) a function that provides a place where editors can look for and access certain commonly used files (such as master clips), avoiding the need to look through many different User Folders to find the desired bin or Project File;

iii) a function for ensuring that if a file is opened from within the Group Bins or Group Project Files, if the file is then moved or rearranged by another user there is no danger that the user who opened up the file will accidentally create a new copy of the file (because the file was opened read only in the first place).

iv) a function for allowing users to drag files OUT of the Group Bins or Group Project Files back to the own User Folders if it should be necessary to further modify the contents of the Avid Bin or Final Cut Project file; and, v) a function for dragging a file in and out of Group Bins or Group Project Files is only possible from within the standalone Final Cut Project Browser or from the new standalone Avid Project Browser, because movements of files in and out essentially "break" normal filesystem rules. However, performing these actions from within the collaborative editing client applications means they can actually be performed by the collaborative editing server with administration permissions that exceed the permissions of the user.

Further, a method of the present invention is now described as follows:

In a first step, there is implemented generating an interface to collect information for creating a New Shared Project Space. This step would entail implementing a program or script that generates a GUI for a user with administrative privileges to provide a desired name for a new Project Space, and (ideally through the GUI) for a user with administrative privileges to provide a list of users who will be members of the new Project Space.

Then, in an additional step, there is provided generating an interface to create a New Shared Project Space. That is, from the collected information in the first step, issuing commands through the operating system to create a new directory structure on an ext3 (or similar) filesystem. An example new directory structure appears as follows:

```
/home/shared_project_spaces
    /new project space 1
        /user1
        /user2
        /user3
        /shared_projects
```

Then, there is implemented the step of creating a New Shared Project. This step would entail implementing a program or script that generates a GUI for a user with administrative privileges to provide a desired name for a new Shared Project and, from the collected information in the first step, issue commands through the operating system to add new sub-directories to the above directory structure. In the methodology employed, the symbolic links, as indicated are automatically placed to ensure the file virtualization as described. A resulting directory structure at the end of this step appears as:

```
/home/shared_project_spaces
    /new project space 1
        /user1   directory exported as network volume that becomes user1's view of "new project space 1"
            /new project
                /user1 {symbolic link to ../../shared_projects/new project/user1}
                /Other Users
                    /user2 {symbolic link to ../../../shared_projects/new project/user2}
                    /user3 {symbolic link to ../../../shared_projects/new project/user3}
                /Group Bin {symbolic link to ../../shared_projects/new project/Group Bins}
                /Unprotected {symbolic link to ../../shared_projects/new project/Unprotected}
        /user2 directory exported as network volume that becomes user2's view of "new project space 1"
            /new project
                /user2   {symbolic link to ../../shared_projects/new project/user2}
                /Other Users
                    /user1 {symbolic link to ../../../shared_projects/new project/user1}
                    /user3 {symbolic link to ../../../shared_projects/new project/user3}
                /Group Bins {symbolic link to ../../shared_projects/new project/Group Bins}
                /Unprotected {symbolic link to ../../shared_projects/new project/Unprotected}
        /user3   directory exported as network volume that becomes user3's view of "new project space 1"
            /new project
                /user3 {symbolic link to ../../../shared_projects/new project/user3}
                /Other Users
```

```
        /user1 {symbolic link to ../../../shared_projects/new project/user1}
        /user2 {symbolic link to ../../../shared_projects/new project/user2}
        /Group Bins {symbolic link to ../../shared_projects/new project/Group Bins}
        /Unprotected {symbolic link to ../../shared_projects/new project/Unprotected}
  /shared_projects
     /new project
        user1
        user2
        user3
        Group Bins
        Unprotected
```

While creating the above directory structure, ownerships and permissions and extended attributes are carefully set on all folders via standard operating system commands such as "chmod", "chown, and "setfacl" such that users are not able to delete or tamper with the above directory structure. For instance, users cannot delete or move their own "user folders", nor can they directory delete or modify the "Other Users", "Group Bins" and "Unprotected" folders or their contents. For example, ownerships and permissions may be set in the lower half of the directory structure depicted above, as follows:

|  | Owner | Group | Permissions | Sticky Bit |
|---|---|---|---|---|
| /home/shared_project_spaces | editshare | editshare | 0755 | No |
| /new project space 1 | editshare | editors | 2750 | No |
| /user3 | editshare | editors | 7770 | Yes |
| /new project (note 1) | editshare | editors | 7770 | Yes |
| /user3 | *root (user3) | editors | 0750 | No |
| /Other Users | *root (editshare) | editors | 0750 | No |
| /user1 | *root (editshare) | editors | 0750 | No |
| /user2 | *root (editshare) | editors | 0750 | No |
| /Group Bins | *root (editshare) | editors | 0750 | No |
| /Unprotected | *root (editshare) | editors | 2770 | No |
| /shared_projects | editshare | editors | 2750 | No |
| /new project | editshare | editors | 2750 | No |
| user1 | user1 | editors | 2750 | No |
| user2 | user2 | editors | 2750 | No |
| user3 | user3 | editors | 2750 | No |
| Group Bins | editshare | editors | 0750 | No |
| Unprotected | editshare | editors | 2770 | No |

In this method, for the users assigned to the new project, directory symlinks are owned by "root" and therefore they cannot be modified or deleted by the "user" because they are located inside directories that are not owned by the user and that have the "sticky bit" set on them.

With respect to the "new project" created under "user 3", while this "new project" is not owned by the user, the user is still able to create new files and directories immediately underneath the "new project" directory because the directory is "group writable" and the user is a member of the "editors" group. The "new project" directory seen by any given user is not visible to any other user. Therefore there isn't any danger of this directory being accessed or tampered with my any other user. Although it is group writable, only one user can access it and therefore effectively it belongs to that single user.

Once the above directory structure is created, users are able to freely create, modify, move and delete files within their own directories (in this case, the Project Files made by the non-linear editing program Final Cut Pro). In addition, users get read-only access to any files in any other user's directories. Users can freely move files in and out of the Unprotected directory. Users cannot move files in and out of the Group Bins directory by communicating instructions to the Server's operating system, which performs the movement of files for the user.

In order to ensure that files are always readable by all users who have access to the shared project space, and to ensure that subdirectories always have desirable permissions and ownership attributes, there is a notification process (for example, "inotify") running on the server that monitors the creation and movement of all files and directories within the shared project space. Whenever a file or directory is created, or whenever a file or directory is moved from one directory to another, the notification process wakes up and sets the permissions on the moved or created file or directory such that when they are when they are in the following locations they have the following attributes:

|  | Owner | Group | Permissions |
|---|---|---|---|
| file in a user's folder | user | editors | 0750 |
| directory in a user's folder | user | editors | 2750 |
| file in Unprotected | editshare | editors | 770 |
| directory in Unprotected | editshare | editors | 2770 |
| file in Group Bins | editshare | editors | 0750 |
| directory in Group Bins | editshare | editors | 2750 |

Referring now to drawings, and particularly to FIG. 14, there is shown the overall computing environment in which the present invention may be implemented. As will be described in greater detail herein, the file virtualization feature enables a server device 20 to permit multiple NLE workstations to see and access the same media files (video, audio, graphics, etc.) stored in a central storage media while essentially keeping each workstation isolated from the others (i.e., unaware that the others exist).

As shown in FIG. 14, the overall computing environment in which the present invention may be implemented includes a server device 20 connecting multiple video-editing client workstations 30*a*, 30*b*, . . . , 30*n* via a high speed network connection (e.g., Gigabit Ethernet or 10 Gigabit Ethernet). The media data can flow between the server 20 and the workstations via a switch device 25, through a direct Ethernet connection or other connection between server and workstation, or through a wireless connection. The server device 20 preferably includes one or more processor devices, e.g., an Intel Pentium4 or Xeon or an AMD Opteron, supporting processor speeds in excess of 2.4 GHz in the case of the Pentium4 and Xeon, 1.8 Ghz in the case of the Opteron. Furthermore, the server device 20 preferably includes 1 Gigabyte or more of RAM. In addition, the server 20 includes at least one high speed Ethernet port (preferably 1 Gigabit or higher). The server 20 also includes a means for storing digital media files and other data and preferably providing Terabytes of storage capacity, for example, a data storage subsystem 50 consisting of hardware RAID cards which are attached both to 32-bit PCI or 64-bit PCI/PCI-X/PCI-Express slots on the motherboard and to high-capacity internal hard drives (e.g., Serial ATA drives), and/or a data storage subsystem 52 consisting of external RAID arrays which are connected to Fibre Channel or SCSI Adapters which are also attached to 32-bit PCI or 64 bit PCI/PCI-X or PCI-Express slots on the server motherboard. More particularly, the data storage subsystem 50 may comprise storage media including, but not limited to, magnetic hard disk, optical storage drives, and even solid state disk and memory cards, etc. As would be known to skilled artisans, the hardware architecture may alternately comprise media access control devices configured to support IDE, SCSI, Fibre Channel, Firewire, and USB devices, protocols and topologies. Regardless of the storage media controller contemplated (e.g., SATA, IDE, or SCSI) it will control multiple storage media drives 52 configured in and/or connected to the server.

For purposes of discussion, in one embodiment, the centralized shared storage systems for collaborative non-linear editing and manipulation of digital video and audio files is configured with two 3ware (a unit of AMCC, San Diego, Calif.) 9000S-8 Hardware RAID cards each attached to eight 250 GB SATA hard drives. The server and its storage subsystem are connected to an Ethernet network. The switch device 25 enabling communications with each workstation 30*a*, 30*b*, . . . , 30*n* may comprise a Gigabit Workgroup Switch such as provided by SMC Networks® (Irvine, Calif.), enabling workstations to function at full Gigabit speeds with a Gigabit Ethernet adapter 29 having integrated Gigabit Ethernet MAC and PHY layer functions.

The server 20 with its storage subsystem 50, 52 and connections to an Ethernet network, preferably, run the Linux operating system (or, equivalently running a Unix or like Unix variant operating system—including Apple's OS X—which can run the software and hardware as described hereinbelow). The switch device 25 enabling server communications with each workstation 30*a*, 30*b*, . . . , 30*n* may comprise a Gigabit network switch device such as provided by SMC® (Irvine, Calif.) that supports "Gigabit over Copper" Ethernet as well as "Jumbo Frames" (defined by a packet size or Maximum Transmission Unit—MTU—of 9000). This enables workstations 30*a*, 30*b*, . . . , 30*n* to function at full Gigabit speeds over Ethernet cables 60 that allow for maximum data throughput over the network and minimum use of CPU resources both by the server and workstations in order to support network transactions. It is assumed that the server device 20 includes at least two Gigabit Ethernet network adapters 22 having integrated Gigabit Ethernet MAC and PHY layer functions. Such a system—along with the storage subsystem diagrammed—allows for sufficient data transfer between the server and workstations to support at least 10 NLE workstations or other capable hardware such as, but not limited to, encoders, playout servers, and video recorders that play from and record to devices such as hard drives simultaneously accessing media files on the storage subsystem.

It is understood that, with respect to the workstations 30*a*, 30*b*, . . . , 30*n* (of FIG. 14) which would be connected to the centralized shared storage systems for collaborative non-linear editing and manipulation of digital video and audio files, each comprises a computer system, including one or more processors or processing units, a system memory, and a bus that connects various system components together. For instance, the bus connects the processor to the system memory. The bus can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system includes one or more display monitors and, operator input devices such as a keyboard, and a pointing device (e.g., a "mouse") for entering commands and information into computer, data storage devices, and implements an operating system such as Linux, various Unix, Macintosh, MS Windows OS, or others.

The computing system additionally includes: computer readable media, including a variety of types of volatile and non-volatile media, each of which can be removable or non-removable. For example, system memory includes computer readable media in the form of volatile memory, such as random access memory (RAM), and non-volatile memory, such as read only memory (ROM). The ROM may include an input/output system (BIOS) that contains the basic routines that help to transfer information between elements within computer device, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus by one or more data media interfaces (not shown). Alternatively, the hard disk drive, magnetic disk drive, and optical disk drive can be connected to the system bus by a SCSI interface (not shown), or other coupling mechanism. Although not shown, the computer can include other types of computer readable media. Generally, the above-identified computer readable media provide non-volatile storage of computer readable instructions, data structures, program modules, and other data for use by computer. For instance, the readable media can store an operating system (O/S), one or more application programs, such as video editing client software applications, and/or other program modules and program data for enabling video editing operations via Graphical User Interface (GUI).

Input/output interfaces are provided that couple the input devices to the processing unit. More generally, input devices can be coupled to the computer through any kind of interface and bus structures, such as a parallel port, serial port, universal serial bus (USB) port, etc. The computer environment also includes the display device and a video adapter card that couples the display device to the bus. In addition to the display device, the computer environment can include other output peripheral devices, such as speakers (not shown), a printer, etc. I/O interfaces are used to couple these other output devices to the computer.

As mentioned, computer system is adapted to operate in a networked environment using logical connections to one or more computers, such as the server device 20 that may include all of the features discussed above with respect to computer device, or some subset thereof. It is understood that any type of network can be used to couple the computer system with server device, such as a local area network (LAN), or a wide area network (WAN) (such as the Internet). When implemented in a LAN networking environment, the computer connects to local network via a network interface or adapter that support the above-mentioned Gigabit over Copper Ethernet as well as Jumbo Frames. When implemented in a WAN networking environment, the computer connects to the WAN via a high speed cable/dsl modem or some other connection means. The cable/dsl modem can be located internal or external to computer, and can be connected to the bus via the I/O interfaces or other appropriate coupling mechanism. Although not illustrated, the computing environment can provide wireless communication functionality for connecting computer with remote computing device, e.g., an application server 20 (e.g., via modulated radio signals, modulated infrared signals, etc.).

In the networked environment, it is understood that the computer system can draw from program modules stored in a remote memory storage devices (not shown) in a distributed configuration. However, wherever physically stored, one or more of the application programs executing the non-linear video editing system of the invention can include various modules for performing principal tasks. For instance, the application program can provide logic enabling input of video source data for storage as media files in the centralized data storage system and/or performing the video editing techniques thereon. Other program modules can be used to implement additional functionality not specifically identified here.

It should be understood that other kinds of computer and network architectures are contemplated. For example, although not shown, the computer system 100 can include hand-held or laptop devices, set top boxes, programmable consumer electronics, playout servers, video encoders, video recorders that play from and record to devices such as hard drives, mainframe computers, etc. However, it is understood that the computing environment 100 can employ a distributed processing configuration. In a distributed computing environment, computing resources can be physically dispersed.

With respect to the file virtualization system of the invention, for every media file stored on the server device—either on the storage subsystem device described herein, or on any other storage device that can be attached to the server (for instance, an array of SCSI drives or a Storage Area Network device that can be linked to the sever through SCSI or Fiber Channel connections)—there is a corresponding symbolic link to that file for each workstation, device, or user that is given access to the server (or to that particular Project Workspace on the server).

In part, the software component of this invention automates the process of creating symbolic links to the actual media files and placing those links in appropriate folders that will only be accessed by one single user or workstation. While each user or workstation, device, or user will see links to files rather than the files themselves, the NLE applications and devices treat the links as if they are the actual files; thus, the NLE applications and devices never have to "see" anything on the server that's outside their own unique folders.

Thus, advantageously, the collaborative editing environment on a centralized data storage system enables one or more editors running a non-linear video editing (NLE) program to collaborate on projects, notwithstanding that the fact that the non-linear video editing program might define and natively save projects as a single monolithic and non-divisible file.

Further to this advantageous embodiment, the collaborative editing environment on a centralized data storage system provides a tool for creating on centralized data storage system a Shared Project Space to which users could be added, defining who has access to that Project Space.

Moreover, the collaborative editing environment on a centralized data storage system is further provides a tool for creating in a given Shared Project Space one or more upper-level folders, each of which can be defined as unique "Shared Project" and into which editors can put Project Files that represent some portion of an overall Project.

Further to this embodiment, the collaborative editing environment on a centralized data storage system is equipped with a mechanism for controlling the permissions and ownership of the Final Cut Project Files such that multiple users cannot overwrite each other's work.

Further to this embodiment, the collaborative editing environment on a centralized data storage system implements software functions that: 1) allow an "Administrator" (or user with limited administration authority) to create, for example, "Final Cut Pro Shared Project Spaces" to which "authorized users" can be added as "members of a Shared Project Space"; 2) Create inside that Shared Project Space any number of Project Directories and give names to the directories to effectively become the "Final Cut Project"; 3) within each such Project Directory, automatically create a structure of User Folders for each of the "members of the space"; and, 4) generate a GUI interface that runs on various platforms, e.g., the Macintosh OS X platform, to display the User Folder Structure alongside the original NLE application. Essentially, the GUI application is a specialized file manager that provides a file manager view that: 1) allows the manipulation of a collection of multiple project files, e.g., such as provided by the Final Cut Pro NLE application; 2) provides error warning message whenever an editor opens a Final Cut Project file from another User's folder warning that the file is "read only"; and 3) provides error warning message whenever an editor attempts to move, modify, or delete a file that belongs to another editor.

Once a Shared Project is defined, all editors using that NLE application who have access to the Shared Project Space can simultaneously view the project, e.g., a "Final Cut Project" (a "folder" with a name that defines the "Project"), create, modify and delete these Project Files in their OWN User Folders, and view as "read-only" the Final Cut Project files that are located in Other User's folders. Functions are implement that prevent editors from moving, deleting, modifying or renaming Project files that are located in another editor's User folder.

Further to this embodiment, the collaborative editing environment is programmed to provide for Shared Final Cut Pro Projects a special folder within each Project Directory called "Unprotected Projects" that allows editors to change who owns or controls a given Final Cut Pro Project file. All editors have the right to drag their own Final Cut Pro project files into the "Unprotected Projects" folder. When EditShare software detects that a new file has been put there, a "watchdog function" on the EditShare Server changes the ownership and permissions on the file such that any other editor can now take the file out of Unprotected Projects and drag the file to his/her own User Folder (at which point another EditShare watchdog function on the server once again changes the ownership and permissions on the file such that the "new owner" has exclusive write access over the file).

Accordingly, there is provided a Final Cut Pro Project Sharing feature by treating Final Cut Pro Projects as a collection of smaller Project files, the permissions and ownerships of which could each be controlled independently.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described my invention, what I claim as new, and desire to secure by Letters Patent is:

1. A system for enabling collaboration on one or more video editing projects that run on a non-linear video editing (NLE) program, the system comprising:
   a shared project space within a hierarchical file structure on a computer-accessible storage device, the shared project space being associated with one or more editors;
   one or more automatically created project folders corresponding to one or more shared video editing projects, each of the one or more project folders containing one or more automatically created user folders, each of the one or more user folders being uniquely associated with only one of the one or more editors;
   multiple project files stored within at least one of the one or more project folders or user folders, the multiple project files having automatically assigned ownership, permissions, or both, based at least in part on the folder within which the multiple project files reside, wherein only the one of the one or more editors associated with a respective user folder of the one or more automatically created user folders can view, create, modify, move, and delete the multiple project files stored in the respective user folder;
   wherein the multiple project files can be viewed, created, modified, moved, and deleted only as permitted by the ownership, permissions, or both, that are assigned to the multiple project files;
   wherein, when the multiple project files are stored in a first editor user folder uniquely associated with a first editor user, the multiple project files can be viewed, created, modified, moved, and deleted only by the first editor user as permitted by the ownership, permissions, or both of the first editor user folder, but can only be viewed and duplicated by other one or more editors;
   in response to an event of the first editor user transferring the multiple project files directly from the first editor user folder directly to a second editor user folder uniquely associated with a second editor user, the ownership, permissions, or both, associated with the multiple project files are automatically assigned to the second editor user folder so the multiple project files stored in the second editor user folder can be viewed, created, modified, moved, and deleted only by the second editor user, but the multiple project files can only be viewed and copied by other one or more editors, including the first editor user; and
   wherein the NLE program saves metadata associated with each of the multiple project files as a single monolithic and non-divisible file, and wherein the multiple project files together form a single shared video editing project.

2. The system of claim 1, wherein the contents of the user folders are viewable by all editors associated with the shared project space within which the user folders reside.

3. The system of claim 1, further wherein the system is configured to enable transferring the multiple project files from a first editor of the one or more editors to a second editor of the one or more editors.

4. The system of claim 3, wherein the multiple project tiles are transferred by way of a group project folder and the ownership, permissions, or both, are automatically updated.

5. The system of claim 3, wherein the multiple project files are transferred by way of an unprotected folder and the ownership, permissions, or both, are automatically updated.

6. The system of claim 3, wherein the system is configured to provide a predetermined amount of time during which transfer can be undone before the ownership, permissions, or both, are automatically updated.

7. The system of claim 1, further comprising an automatically created group project file folder that is located within the project folder and that is separate from the one or more user folders;
   wherein the group project file folder is configured in such a way that any of the one or more editors is allowed to rearrange the contents of the group project file folder into subject matter subfolders; and
   wherein ownership, permissions, or both, are automatically assigned such that contents of the group project file folder are designated read only to the one or more editors.

8. The system of claim 1, further comprising:
   for each of the one or more editors, one or more virtual views that are each configured to present information to only one corresponding editor, each of the one or more views comprising:
      a symbolic link that points to the corresponding editor's associated user folder;
      an automatically created other users folder that is separate from the symbolic link to the corresponding editor's associated user folder; and
      for each contents additional editor of the one or more editors that is not the one corresponding editor, a symbolic link automatically placed inside the other users folder that points to the additional editor's associated user folder;
   wherein the one or more views enable the one or more editors to view the contents of all of the one or more associated user folders for one of the one or more projects.

9. The system of claim 8, wherein each of the one or more views further comprises a symbolic link to an unprotected folder and a symbolic link to a group project file folder.

10. The system of claim 1, wherein,
when the first editor user folder is owned by the first editor user and the second editor's user folder is owned by the second editor user,
the first editor can view, create, modify, move, and delete any multiple project files in the first editor's user folder, but can only view or copy any multiple project files in the second editor's user folder; and
the second editor can view, create, modify, move, and delete any multiple project files in the second editor's user folder, but can only view or copy any multiple project files in the first editor's user folder.

11. A computer-implemented method for enabling collaboration on one or more video editing projects that run on a non-linear video editing (NLE) program, the method comprising:
establishing a shared project space within a hierarchical file structure on a computer-accessible storage device, the shared project space being associated with one or more editors;
automatically creating one or more project folders corresponding to one or more shared video editing projects, each of the one or more project folders containing one or more automatically created user folders, each of the one or more user folders being uniquely associated with only one of the one or more editors;
storing multiple project files within at least one of the one or more project folders or user folders;
automatically assigning ownership, permissions, or both, to the multiple project files based at least in part on the folder within which the multiple project files reside, wherein only the one of the one or more editors associated with a respective user folder of the one or more automatically created user folders can view, create, modify, move, and delete the multiple project files stored in the respective user folder;
wherein the multiple project files can be viewed, created, modified, moved, and deleted only as permitted by the ownership, permissions, or both, that are assigned to the multiple project files;
wherein, when the multiple project files are stored in a first editor user folder uniquely associated with a first editor user, the multiple project files can be viewed, created, modified, moved, and deleted only by the first editor user as permitted by the ownership, permissions, or both of the first editor user folder, but can only be viewed and duplicated by other one or more editors;
wherein transferring the multiple project files comprises the first editor user transferring the multiple project files directly from the first editor user folder directly to a second editor user folder uniquely associated with a second editor user;
in response to the transferring, automatically assigning the ownership, permissions, or both, associated with the multiple project files to the second editor user folder so the multiple project files stored in the second editor user folder can be viewed, created, modified, moved, and deleted only by the second editor user, but the multiple project files can only be viewed and copied by other one or more editors, including the first editor user; and
wherein the NLE program saves metadata associated with each of the multiple project files as a single monolithic and non-divisible file, and wherein the multiple project files together form a single shared video editing project.

12. The computer-implemented method of claim 11, wherein the contents of the user folders are viewable by all editors associated with the shared project space within which the user folders reside.

13. The computer-implemented method of claim 11, further comprising transferring the multiple project files from a first editor of the one or more editors to a second editor of the one or more editors.

14. The computer-implemented method of claim 13, wherein transferring the multiple project files comprises:
transferring the multiple project files by way of a group project folder; and
automatically updating the ownership, permissions, or both.

15. The computer-implemented method of claim 13, further comprising providing a predetermined amount of time during which the transferring of the multiple project files can be undone before the ownership, permissions, or both, are automatically updated.

16. The computer-implemented method of claim 11, further comprising:
for each of the one or more editors, creating one or more virtual views that are each configured to present information to only one corresponding editor;
for each of the one or more views, automatically creating a symbolic link that points to the corresponding editor's associated user folder;
for each of the one or more views, automatically creating an other users folder that is separate from the symbolic link to the corresponding editor's associated user folder; and
for each of the one or more views, automatically creating additional symbolic links that point to the user folder of each additional editor that is not the corresponding editor and placing the additional symbolic links inside the other users folder;
wherein the one or more views enable the one or more editors to view the contents of all of the one or more associated user folder for one of the one or more projects.

17. The computer-implemented method of claim 16, further comprising, for each of the one or more views, creating a symbolic link to an unprotected folder and a symbolic link to a group project file folder.

18. A non-transitory computer-readable storage medium with an executable program stored thereon, wherein the program contains instructions to execute steps for enabling collaboration on one or more video editing projects that run on a non-linear video editing (NLE) program, the steps comprising:
establishing a shared project space within a hierarchical file structure on a computer-accessible storage device, the shared project space being associated with one or more editors;
automatically creating one or more project folders corresponding to one or more shared video editing projects, each of the one or more project folders containing one or more automatically created user folders, each of the one or more user folders being uniquely associated with only one of the one or more editors;
storing multiple project files within at least one of the one or more project folders or user folders;
automatically assigning ownership, permissions, or both, to the multiple project files based at least in part on the folder within which the multiple project files reside, wherein only the one of the one or more editors associated with a respective user folder of the one or more automatically created user folders can view, create, modify, move, and delete the multiple project files stored in the respective user folder;

wherein the multiple project files can be viewed, created, modified, moved, or deleted only as permitted by the ownership, permissions, or both, that are assigned to the multiple project files;

wherein, when the multiple project files are stored in a first editor user folder uniquely associated with a first editor user, the multiple project files can be viewed, created, modified, moved, and deleted only by the first editor user as permitted by the ownership, permissions, or both of the first editor user folder, but can only be viewed and duplicated from a second editor user folder by other one or more editors;

in response to an event of the first editor user transferring the multiple project files directly from the first editors user folder directly to a second editor user folder uniquely associated with a second editor user, the ownership, permissions, or both, associated with the multiple project files are automatically assigned to second editors-s user folder so the multiple project files stored in the second editor user folder can be viewed, created, modified, moved, and deleted only by the second editor user, but the multiple project files can only be viewed and copied by other one or more editors, including the first editor user; and wherein the NLE program saves metadata associated with each of the multiple project files as a single monolithic and non-divisible file, and wherein the multiple project files together form a single shared video editing project.

* * * * *

UNITED STATES PATENT AND TRADEMARK OFFICE
CERTIFICATE OF CORRECTION

| | | |
|---|---|---|
| PATENT NO. | : 9,552,843 B2 | Page 1 of 1 |
| APPLICATION NO. | : 12/999964 | |
| DATED | : January 24, 2017 | |
| INVENTOR(S) | : Andrew Liebman | |

It is certified that error appears in the above-identified patent and that said Letters Patent is hereby corrected as shown below:

In the Claims

Column 20, Claim 4, Line 28, the word "tiles" should read "files".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*